United States Patent [19]

Cardwell et al.

[11] 3,950,486

[45] *Apr. 13, 1976

[54] METHOD FOR SEPARATING METAL CONSTITUENTS FROM OCEAN FLOOR NODULES

[75] Inventors: Paul H. Cardwell, Zanoni; William S. Kane, Wicomico, both of Va.

[73] Assignee: Deepsea Ventures, Inc., Gloucester Point, Va.

[ * ] Notice: The portion of the term of this patent subsequent to Aug. 27, 1991, has been disclaimed.

[22] Filed: Apr. 26, 1972

[21] Appl. No.: 247,554

Related U.S. Application Data

[63] Continuation-in-part of Ser. Nos. 40,564, May 26, 1970, abandoned, Ser. No. 142,697, May 12, 1971, Pat. No. 3,752,745, Ser. No. 40,565, May 26, 1970, abandoned, Ser. No. 184,770, Sept. 29, 1971, abandoned, Ser. No. 40,587, May 26, 1970, abandoned, Ser. No. 184,771, Sept. 29, 1971, Pat. No. 3,773,635, Ser. No. 40,590, May 26, 1970, abandoned, and Ser. No. 40,730, May 26, 1970, abandoned.

[52] U.S. Cl. ..................... 423/24; 423/38; 423/49; 423/139; 423/150

[51] Int. Cl.² C01G 3/04; C01G 45/06; C01G 49/10; C01G 53/09

[58] Field of Search ............... 75/101 BE, 111–114; 423/49, 51, 38, 46, 149, 24, 139, 150

[56] References Cited

UNITED STATES PATENTS

| | | | |
|---|---|---|---|
| 2,658,813 | 11/1953 | Whitehouse et al. | 75/111 X |
| 2,752,299 | 6/1956 | Cooper | 423/49 X |
| 2,766,115 | 10/1956 | Graham et al. | 75/114 X |
| 2,777,755 | 1/1957 | Eberhardt | 423/49 |
| 2,877,110 | 3/1959 | Cooper et al. | 423/49 |
| 3,455,680 | 7/1969 | Ashbrook et al. | 75/119 X |
| 3,578,394 | 5/1971 | Palmer | 423/49 |
| 3,752,745 | 8/1973 | Kane et al. | 423/139 |
| 3,773,635 | 11/1973 | Kane et al. | 75/119 |
| 3,832,165 | 8/1974 | Kane et al. | 75/80 |

*Primary Examiner*—Oscar R. Vertiz
*Assistant Examiner*—Brian E. Hearn
*Attorney, Agent, or Firm*—Barry G. Magidoff

[57] ABSTRACT

Ocean floor nodules are treated with aqueous hydrogen halide to produce a pregnant leach solution which is subjected to selective solvent extraction to isolate metal values contained in the ore.

9 Claims, 12 Drawing Figures

CHLORINATION

NODULE + NaCl + H₂SO₄ (100% OF THEORETICAL) + COAL (10% OF THEORETICAL) TEMP. 950°C, Cl₂ FLOW - 1850 ML/MIN

NODULE + HCl, TIME 4 HOURS, FLOW - 1600 ML/MIN

NODULE + HCL FLOW 1600 ML/MIN + Cl₂ FLOW 600ML/MIN

NODULE + H₂SO₄ + NaCl + HCl, HCl FLOW - 1600 ML/MIN

INVENTORS
WILLIAM S. KANE
PAUL H. CARDWELL

METHOD FOR SEPARATING METAL CONSTITUENTS FROM OCEAN FLOOR NODULES

The application is a continuation in part of copending applications Ser. No. 40,564 filed May 26, 1970; now abandoned; Ser. No. 142,697, filed May 12, 1971, now U.S. Pat. No. 3,752,745; Ser. No. 40,565, filed May 26, 1970; now abandoned; Ser. No. 184,770, filed Sept. 29, 1971, now abandoned; Ser. No. 40,587, filed May 26, 1970; now abandoned; Ser. No. 184,771, filed Sept. 29, 1971, now U.S. Pat. No. 3,773,635; Ser. No. 40,590 filed May 26, 1970, now abandoned; Ser. No. 40,730, filed May 26, 1970, now abandoned.

With the increased awareness on the part of both the public and the metals industry of the ecological dangers that can arise from continued surface mining of minerals and the increased problems of pollution caused by the refining procedures required for most ores mined from the land, industry has been interested for several years now in the mining of minerals from the sea. This has been an extremely elusive target up to the present. The directions taken have included both attempts to wrest minerals directly from solution in sea water and the mining of ores which are available on the floor of the ocean. These do not require any stripping of the surface but can merely be scooped up or in other ways removed from the surface without actually rending the earth's surface.

Ocean floor nodules have been known since they were first collected in the first half of the 1870s. They have been studied by many workers in an attempt to determine their composition, and after their composition had been determined to try to decipher ways to wrest from their peculiar structure the valuable metals contained therein. It is presently believed that these nodules are actually creations of the sea; they are somehow grown from the metal compounds which are dissolved in sea water, generally in the form of the metal oxides.

The metal values in the nodules are almost exclusively in the form of the oxides and moreover are present in a very peculiar physical configuration. The physical and chemical structure of the nodules are believed to be a direct result of the conditions under which they were created and to which they have been exposed since their creation. First, the nodules have never been exposed to temperatures other than those at the bottom of the ocean at the location at which they were formed. They have an extremely large surface area, often better than 50% porosity, and they are thus relatively chemically reactive ore.

The nodules are formed in an extremely complex crystal matrix of iron and manganese oxides: tiny grains of each oxide of a size and type which are substantially impossible to separate with presently available physical means. These iron and manganese oxides form the crystalline structure within which are held, by means not precisely known, other metal compounds, most likely oxides, including those of nickel, copper and cobalt, as the main ingredients, followed by chromium, zinc, tin, vanadium, and many more elements, including the rare metals silver and gold.

The precise chemical composition of the nodules vary depending upon their location in the ocean. The variation apparently is caused by differences in temperature in various places, differences in composition of sea water, perhaps caused by the pressure and temperature variations at different depths and composition of adjacent land areas; variations in the amount of oxygen which is present in the water in different locations and perhaps other variables not readily apparent to observers. Generally, however, in almost all cases the metals which are present in major proportions are manganese and iron. The following table (taken from an article entitled "The Geochemistry of Manganese Nodules and Associated Deposits from the Pacific and Indian Oceans" by Croonan and Tooms in *Deep Sea Research* (1969), Volume 16, pages 335–359, Pergamon Press (Great Britain)) shows the relative compositions of the most valuable metals contained in nodules taken from different areas within the Pacific and Indian Oceans.

Table I

|  | 1 | 2 | 3 | 4 | 5 | 6 | 7 | 8 | 9 |
|---|---|---|---|---|---|---|---|---|---|
| Mn | 13.96 | 16.87 | 15.71 | 15.85 | 22.33 | 19.81 | 16.61 | 13.56 | 15.83 |
| Fe | 13.10 | 13.30 | 9.06 | 12.22 | 9.44 | 10.20 | 13.92 | 15.75 | 11.31 |
| Ni | 0.393 | 0.564 | 0.956 | 0.348 | 1.080 | 0.961 | 0.433 | 0.322 | 0.512 |
| Co | 1.127 | 0.395 | 0.213 | 0.514 | 0.192 | 0.164 | 0.595 | 0.358 | 0.153 |
| Cu | 0.061 | 0.393 | 0.711 | 0.077 | 0.627 | 0.311 | 0.185 | 0.102 | 0.330 |
| Pb | 0.174 | 0.034 | 0.049 | 0.085 | 0.028 | 0.030 | 0.073 | 0.061 | 0.034 |
| Ba | 0.274 | 0.152 | 0.155 | 0.306 | 0.381 | 0.145 | 0.230 | 0.146 | 0.155 |
| Mo | 0.042 | 0.037 | 0.041 | 0.040 | 0.047 | 0.037 | 0.035 | 0.029 | 0.031 |
| V | 0.054 | 0.044 | 0.036 | 0.065 | 0.041 | 0.031 | 0.050 | 0.051 | 0.040 |
| Cr | 0.0011 | 0.0007 | 0.0012 | 0.0051 | 0.0007 | 0.0005 | 0.0007 | 0.0020 | 0.0009 |
| Ti | 0.773 | 0.810 | 0.561 | 0.489 | 0.425 | 0.467 | 1.007 | 0.820 | 0.582 |
| L.O.I. | 30.87 | 25.50 | 22.12 | 24.78 | 24.75 | 27.21 | 28.73 | 25.89 | 27.18 |
| Depth (m) | 1757 | 5001 | 5049 | 1146 | 4537 | 4324 | 3539 | 3793 | 5046 |

1. Mid-Pacific Mountains (5 samples)
2. West Pacific (23 samples)
3. Central Pacific (9 samples)
4. Southern Borderland Seamount Province (5 samples)
5. Northeast Pacific (10 samples)
6. Southeast Pacific (8 samples)
7. South Pacific (11 samples)
8. West Indian Ocean (10 samples)
9. East Indian Ocean (14 samples)

Nodules are also found in the Atlantic ocean; however, it has been found that generally these nodules contain lower proportions of the more valuable metals and correspondingly higher proportions of the less desirable metals which cannot be readily refined and which have little or no value. These include alkali and alkaline earth metals.

Because of the peculiar and intricate crystal structure of the ocean floor nodules, the common refining techniques used for the refining of land ores are not generally suitable for the nodules. The art has struggled with various schemes for refining these nodules but up to the present no process has been devised which permits the commercial refining of these metals to obtain economically significant quantities of the valuable metals contained therein in the necessary degree of priority.

Mero, U.S. Pat. No. 3,169,856, has devised a scheme for a very peculiar type of nodule wherein the separate mineral phases of manganese and iron contain different metals; specifically it was stated that nickel and copper were contained only in the manganese phase of the material whereas cobalt was present solely in the iron phase. Apparently according to Mero, the oxides were in solid solution therein. The Mero material, if he was correct in his analysis, was very unusual. Mero describes one method for breaking up the nodule matrix of the peculiar type of nodules he was working with. This included dissolving metal oxides or compounds of the metals in aqueous solutions. Mero however requires the use of a strong reducing agent which completely destroys the nodule matrix by reducing the manganese from a plus 4 (+4) valence state manganese and ferric, plus three (+3) valence state iron, to the corresponding manganous and ferrous (+2) valence states, respectively. Mero was then able to partially separate out the various valuable metal contents.

Among the refining techniques for land ores are selective reduction processes which selectively reduce certain metals to the elemental state. Such processes have been practiced in the separation of nickel and cobalt from the iron which is present in lateritic ores. The mixed metals are then reacted with carbon monoxide to form the corresponding carbonyl compounds, followed by treatment with chlorine. See for example U.S. Pat. No. 2,998,311, to Illis. Because of the peculiarly complex nature of the under sea nodules, such treatments would not be suitable therefore.

Iron-nickel ores, e.g. of the lateritic or serpentine type, which contain only a minor proportion of manganese, have also been refined beginning with a "chloridizing" procedure, using a mixture of HCl and water vapor to selectively form chlorides of nickel and cobalt to the exclusion of iron and chromium. The nickel and cobalt chlorides are then leached out using water. (See U.S. Pat. No. 2,766,115 to Graham et al.).

Other "chloridizing" processes have found some use with pyrites cinders, using various sources for the chlorine, including metal salts, such as $CaCl_2$ and $NaCl$ as well as $HCl$ and $Cl_2$. These processes have been carried out at vaporizing temperatures for the metal chlorides as well as at lower temperatures. High temperature "chloridizing" processes, wherein the metal chlorides are volatilized, have been used in the refining of manganiferous iron ore, utilizing $NaCl$ or $CaCl_2$ as the reagent. In this case the ore contains manganous and ferrous materials, which are not reduced.

Nickel-and cobalt-containing ores have also been refined by "chloridizing" at high temperatures using $FeCl_3$ as the chloride source. The process is operated at above the evaporation temperatures of the chlorides formed and selectively "sublimates" the chloride products. (See U.S. Pat. No. 2,733,983). Another high temperature process, following which the metal chlorides are vaporized and collected by condensation or "sublimation", involves the reaction of an "oxidic" iron ore with chlorine and a solid carbon-containing reductin agent.

Nickel-containing ores which contained cobalt and iron, but generally not the high proportion of manganese found in the deepsea nodules, have also been initially refined by roasting under reduction conditions, such as in the presence of producer gas. See for example U.S. Pat. No. 2,913,334. Similarly, metal oxide-containing ores, which can contain certain manganese, nickel, cobalt and iron compounds have been roasted with sulfur or sulfide-containing materials and then leached to remove the valuable metals as dissolved salt. In the nodules, these oxides are all found intimately combined together in different proportions and in a unique form together with a host of other metals, especially copper.

The art did not, however, have a simple direct method for initially refining ocean floor nodules, ores which contain high proportions or iron and manganese is an unusual physical state, so as to separate out iron from the remaining metals which are present in high concentration.

In accordance with the present invention ocean nodule ore is refined by (1) reacting the nodules under acid, or salt-forming, -selective reducing conditions to form a mixture comprising the water soluble salts of divalent manganese, copper, nickel, cobalt and trivalent iron; (2) separating out the iron from the products of the salt-forming-reduction reaction; (3) forming an aqueous solution of the metal salts and (4) separating the dissolved salts. Steps (2) and (3) can be in interchangeable chronological order. Encompassed within steps (2) and (3) above are processes wherein a solution of all of the metal halides, including those of iron, cobalt, nickel, copper and manganese, are dissolved in water, and the iron is then removed, therefrom; also encompassed are processes wherein the iron halide is first converted to a water-insoluble material, e.g. iron oxide, and the remaining halides are dissolved in water and the solution separated from the insoluble iron material. If an aqueous solution is formed including dissolved iron, the iron can be separated by drying the solution and then converting the iron salt to iron oxide, by extracting of the iron directly, or by converting the dissolved ferric salt selectively to an insoluble form and removing it from the solution. The iron should be removed because it is present in sufficient quantities to interfere with the separation of the other, more valuable metals.

The acid-selective reduction process of this invention destroys the iron oxide-manganese oxide matrix of the nodule, freeing the various other metal values so that they may be separated out, while maintaining the iron in the more easily eliminated ferric state.

The acidic-selective reduction agents useful in the present procedure can be described as materials which will selectively reduce plus four valence state manganese but not ferric iron and will result in the formation of acid salts, e.g. halides, of the metals which are present. Preferred such agents include single compounds, such as the hydrogen halides, both in the gaseous state and in aqueous solution, and two-component mixtures wherein one component provides the acid effect, i.e. forms the metal salts, e.g. the halide portion, and a second component provides the reducing effect. Such materials include mixtures e.g. of a halogen as the salt-forming with a reducing agent, such as hydrogen, HCl, HBr, or carbon, or a source thereof, such as a hydrocarbon or carbon monoxide. In either of the above general cases, the reaction results in the formation of manganous halide, ferric halide and the halides of the remaining metals which are present in the nodule. Useful halogens include fluorine, chlorine, bromine and iodine; however, because of availability and the economy of combined easy handling and high reactivity, chlorine is preferred. It is gaseous at normal temperatures, it is not overly reactive and it can thus be readily handled, but yet is sufficiently reactive so as to proceed quickly and at a high rate. Chlorine is the preferred halogen whether present as the hydrogen chloride or as the elemental chlorine. However, elemental bromine, iodine and fluorine, and the corresponding halide, e.g. hydrogen bromide, can also be utilized if available.

As the single component acid-selective reducing agent, a hydrogen halide is preferred. Preferably the hydrogen halide is utilized in the gaseous state.

The temperature of reaction is surprisingly, not at all critical as far as the halide formation-selective reduction reaction is concerned. Temperatures of from about minus (−) 40°C up to about 1000°C can be successfully used at economic rates of reaction. However, it is preferred to operate at above the boiling point of aqueous HCl, i.e. about 110°C at atmospheric pressure, to avoid the formation of any aqueous liquid during the reaction, or of whichever hydrogen halide is present.

The temperature of reaction does have an effect however, depending upon the method by which the metal halide products are to be separated. If the separation of the iron from the other metals is to be carried out by selective leaching, wherein the iron material is converted to the waterinsoluble oxide and the remaining water-soluble metal halides are leached out by water from the nodule ore, the preferred minimum temperature of reaction is about 500°C. It has been found that at lower temperature of reaction the gangue material present in the nodule is in a form difficult to separate by ordinary liquid-solid separation procedures. A preferred temperature range is about 500° to about 800°C but optimum reaction temperature is from about 500° to about 600°C.

Alternatively, when the separation of the halides from the ore and iron compound is to be carried out by fractional vaporization, i.e. where the metal halides are evaporated and separated by differences in vapor pressures, the temperature of reaction should be at least about 450°C and preferably from about 500° to about 1100°C. Above about 1100°C degradation can occur and/or some of the undesirable gangue material may react with the metal salt or evaporate along therewith. Regardless of the temperature of reaction and method of separation, the chemical reactions are substantially the same and can be summarized by the following reaction equations:

1. $MnO_2 + 4HCl \rightarrow MnCl_2 + 2H_2O + Cl_2$

2. $NiO + 2HCl \rightarrow NiCl_2 + H_2O$

3. $CuO + 2HCl \rightarrow CuCl_2 + H_2O$

4. $Co_2O_3 + 6HCl \rightarrow 2CoCl_2 + 3H_2O + Cl_2$, or $CoO + 2HCl \rightarrow CoCl_2 + H_2O$ 5. (a) $FeO(OH) + HCl \rightarrow FeOCl + H_2O$ and/or (b) $FeO(OH) + 3HCl \rightarrow FeCl_3 + 2H_2O$ At the higher temperatures, i.e. above 600°C. it is believed that $FeCl_3$ is substantially always formed. The above equations are set out utilizing hydrogen chloride as the hydrogen halide; however, the same reactions occur with the corresponding hydrogen bromide and fluoride.

When utilizing the hydrogen halide in the form of an aqueous solution, the same reactions set forth above occur and again the $FeCl_3$ is preferentially formed, i.e. as in equation 5(b). Of course when utilizing the aqueous hydrogen halide the temperatures of reaction are somewhat changed. Generally, the temperatures range up from ambient, about 25°C, to just below the boiling point of the aqueous solution. Generally, the reaction is preferably carried out at close to the boiling point of the aqueous solution, optimally at a temperature of at least about 100°C at atmospheric pressure in order to facilitate the removal of the elemental halogen from the reaction mixture; temperatures below ambient can also be used.

Generally, the reactions with hydrogen halide, whether in the vapor or aqueous states can be carried out under atmospheric pressure. However, if desired, lower pressures can be utilized for the aqueous system to further facilitate removal of the elemental halogen at lower temperatures. The use of higher pressures in either vapor or aqueous systems would increase the cost without any substantial effect on the reaction.

The maximum pressure which can be utilized is actually a function of the economics of the process. Generally, the reactions are substantially independant of pressure.

It should be pointed out that wherever mention is made of utilizing hydrogen halide as a reactant, this is intended to encompass the utilization of reactive precursors for the preparation of the hydrogen halide. Specifically, the reaction between a strong mineral acid and a metal halide, especially an alkali metal or alkaline earth metal halide, will result in the generation of the corresponding hydrogen halide. The strong mineral acids which can be used include e.g., sulfuric acid and its anhydride, sulfur trioxide, mixtures of sulfur trioxide and water, the metal halides which can be used include e.g. the halides of lithium, sodium, potassium, calcium, magnesium, strontium and barium.

Generally, the alkali or alkaline earth metals which are selected will not interfere with the subsequent separation of the desirable metals from the solution as outlined below. For example, sodium and potassium salts are especially suitable as they will substantially be noninterferring with almost any hydrometallurgical procedure which can be utilized for the separation of the desired metals in the nodules and will not interfere with aqueous electrolysis separation for the individual metal chlorides. However, depending on the situation, calcium, strontium, and magnesium salts can also be used, if the subsequent refining operations are of a type which will not be interfered with by these ions.

The procedure for the elimination of the iron material from the mixture with the other metals will depend upon the procedure which is utilized to form the metal chlorides. One advantage of the vaporous hydrogen halide reaction method is that the iron can be readily eliminated before the metals are dissolved in water. This is accomplished, when utilizing the hydrogen halide vapor procedure, by reacting the solid iron chloride, whether in the form of $FeOCl$ or $FeCl_3$, with water. The reaction mixture is preferably cooled, before injecting water, to a temperature of from about 200° to about 400°C, preferably not greater than about 300°C. The reaction can be carried out in the same reator in which the acid-selective reduction reaction occurred. However, the hydrogen halide should be substantially swept out of the reactor before the introduction of the water. Preferably, liquid water can be injected, as by spraying, into the reaction furnace where it will be substantially immediately vaporized at the high temperatures present therein and will then react with the nodule. Steam can also be directly blown into the reactor. The water can be carried to the reacted nodule material as a vapor mixed with a carrier gas, which is substantially inert to the reaction mixture.

The concentration of the water vapor in the carrier gas is not critical. However, the reaction occurs when even as little as about 3 to about 4 percent by volume of the gaseous material blown into the reactor is water vapor. The carrier gas includes air or a gaseous halogen such as chlorine but can also include for example inert gases such as nitrogen, carbon dioxide or any other inert gas. The carrier also serves to sweep out any hydrogen halide which may remain from the previous acid-selective reduction reaction.

The water-saturated ambient air, can be generated by bubbling air through water prior to injection into the reaction vessel. The air is then heated up to the temperature of at least about 200°C and the water vapor which is in the air is sufficient to react with the iron chloride.

The gaseous acid reactant, i.e. the halogen or hydrogen halide, can usefully be mixed with a carrier gas such as air, nitrogen, carbon dioxide or the excess halogen or hydrogen halide, or any inert gas when the metal halides are to be removed by evaporation at the high temperatures abouve about 450°C. Preferably, elemental halogen, e.g. chlorine, is always present to insure that copper chloride is in the lowest temperature fraction evaporated.

The carrier gas serves as a sparge to aid in the removal of the metal halides as they are evaporated, permitting the reaction to be operated at temperatures below the actual boiling point of these metal halides and resulting in the removal of the metal halides.

The vaporized metal halides can be condensed as a mixture, reacted with water vapor or oxygen to convert the iron halide to iron oxide, and leached to form an aqueous solution of the remaining halides. The leach liquor can then be treated as above to separate the various metals. Alternatively, when carrying out the procedure utilizing elemental halogen without any hydrogen halide present, oxygen can be added during the acid-selective reduction step to convert the iron halide immediately to iron oxide if the temperature is kept below about 800°C.

The fractionation of the metal halides can be carried out by a graduated sequential increase in the temperature to which the metal nodules are subjected: those halides having high vapor pressures at lower temperatures will evaporate and be removed; the temperature is then raised incrementally, removing metal halides having lower vapor pressures at each succesively higher temperature.

Alternatively, the temperature of the reaction vessel is maintained constant at a temperature high enough to cause the evaporation of all of the metal halides, and a series of condensors are utilized to condense the materials at various temperatures. The highest vapor pressure materials are the iron and copper halides. The intermediate vapor pressure materials are the nickel and cobalt halides, and the lowest vapor pressure material is the manganese halide. Generally, by this procedure it is simple to obtain substantially pure manganese halide whereas the other halides will generally be condensed as mixtures: the iron and copper halides being in the highest vapor pressure fraction, the nickel, cobalt and some manganese halides being in an intermediate vapor pressure fraction, and substantially pure manganese halide in the lowest v.p. fraction. The fraction containing the iron halide can then be reacted with air or, preferably, with water vapor to form the corresponding iron oxide. The condensate mixture of iron oxide and copper halide can then be leached with water to remove the soluble copper halide. Similarly the mixed halides which are in the intermediate fraction: nickel, cobalt and manganese halides, are dissolved and separated. The condensed pure manganese halide material can be directly reduced to the metal by known methods.

The reaction of the nodules with aqueous hydrogen halides results in the same type of reactions as set forth in equations Nos. 1–5 above.

The ferric chloride which is formed during the aqueous hydrogen halide reaction can be separated from the remaining metal chlorides by evaporating the water, heating the salts up to a temperature of at least 200°C in the presence of water, thus forming the insoluble iron oxide. The remaining metal halides can then be redissolved in water and separated from the iron oxide as described above.

Alternatively, ferric chloride can be removed by other methods including extraction, utilizing materials which preferentially take up the iron from solution. Such materials, include, among the preferred compounds organic phosphates and amines. These compounds are generally dissolved in an inert organic liquid, preferably a hydrocarbon, such as aliphatic or aromatic petroleum liquids, in concentrations which can range from about 5 to about 30 percent by volume. It is known that the extractant power of such solutions can be further increased by utilizing a modifer or conditioner, such as an aliphatic alcohol, e.g. isodecanol. See U.S. Pat. No. 3,224,873 and U.S. Pat. No. 3,449,246.

The organic phosphates which can be used for preferentially extracting iron include preferably the trialkyl phosphates. Such materials have the general formula:

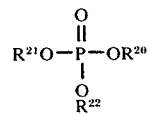

wherein the R groups may be the same or different and are preferably alkyl groups containing from 1 to 10 carbon atoms, optimally from two to six carbon atoms. Examples of such materials include tri-n-butyl phosphate, tri-n-hexyl phosphate, n-butyl-di-n-hexyl phosphate, n-propyl-di-n-butyl phosphate, tri-n-propyl phosphate and triamyl phosphate.

The amines which can be used for preferentially extracting iron include the primary, secondary, tertiary, and quaternary amines, e.g. $R_3NCH_3^+X^-$. Preferably the amines are aliphatic amines wherein each aliphatic group has from 1 to about 30 carbon atoms; preferably the total number of carbon atoms in the molecule being at least about 12 carbon atoms. Examples of the useful amine extractants include primary aliphatic amines having the formula $R-C(CH_3)_2NH_2$, i.e. N-trialkylmethylamine, where R contains from about 18 to about 24 carbon atoms: secondary amines, such as N-lauryl-N-trialkylmethylamine, tertiary amines, such as TIOA triisooctylamine di(-n-octyl) n-hexyl amine, di(-n-hexyl)-n-octylamine, and the quaternary amines, especially in the form of the halide, (chloride), salts, wherein three of the aliphatic groups contain from about 5 to about 15 carbon atoms each and the fourth is preferably a lower alkyl group, e.g. methyl; examples of such preferred compounds include tri(n-$C_{8-10}$ alkyl) methyl ammonium chloride.

The ferric chloride is readily stripped from the phosphate or amine extractant by stripping with water. The thus regenerated extractant can be recycled.

In a preferred embodiment, the aqueous ferric chloride solution thus formed can also be recycled back to the process to act as a preliminary treatment medium for the nodules, the weakly acidic ferric chloride solution dissolves out certain undesirable alkaline materials.

The acid-selective reduction reaction of the nodules can also be carried out using a combination of two components, one of which acts as the reducing agent, the second of which acts as the halogenation, or acid, medium which results in the formation of the corresponding metal halide product.

The acid, or halogen-providing, component is preferably elemental halogen; the reduction medium can be elemental carbon, hydrogen, hydrocarbon, carbon monoxide HCl and HBr. The procedure can be carried out at temperatures of from about 500° to about 1100°C., preferably from about 800° to about 1000°C depending upon the specific reducing medium selected. Generally, the use of elemental carbon or an extremely non-volatile hydrocarbon requires a reaction temperature in the higher end of the range. The presence of an oxygen atmosphere will serve to lower the required temperature. It is believed that oxygen reacts with the carbon to form carbon monoxide. The source of elemental carbon can be pure carbon or any natural or semi-manufactured carbonoceous material such as coal, charcoal, and coke. Preferred, hydrocarbons include those derivable from petroleum, or other natural mineral product; wood or other organic sources can be utilized as the source for the reducing action of carbon. Any hydrocarbon can be used: aromatic, aliphatic, cycloaliphatic, without interfering with its function as a reducing agent. The higher condensed ring aromatic materials have the highest proportion of carbon among the hydrocarbons and therefore provide the greatest unit weight effectiveness as a reducing medium. The lower molecular weight volatile hydrocarbons, however, are more readily mixed with the halogen vapors and therefore have an advantage of ease of handling.

At the high temperatures at which this reaction is carried out the metal halides which are formed have a high vapor pressure, thus can be separated by the same fractional vaporization procedures referred to above for the hydrogen halide high temperature procedure.

The reaction of a carbon-chlorine-nodule system can be summarized as follows as an example of this type of reaction:

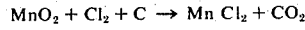
$MnO_2 + Cl_2 + C \rightarrow MnCl_2 + CO_2$

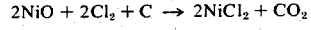
$2NiO + 2Cl_2 + C \rightarrow 2NiCl_2 + CO_2$

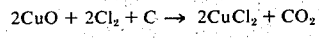
$2CuO + 2Cl_2 + C \rightarrow 2CuCl_2 + CO_2$

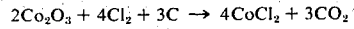
$2Co_2O_3 + 4Cl_2 + 3C \rightarrow 4CoCl_2 + 3CO_2$

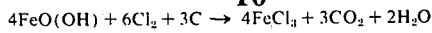
$4FeO(OH) + 6Cl_2 + 3C \rightarrow 4FeCl_3 + 3CO_2 + 2H_2O$

The acid selective reduction reaction of this invention can be carried out using as the reagents a hydrogen halide, an elemental halogen and a reducing agent, e.g., a source of carbon, mixed with nodules to form the metal halides, i.e. a mixture of a one component, e.g. HCl, and a two component reagent, e.g. $Cl_2$ and carbon. The hydrogen halide can be generated exteriorly of the reaction chamber and passed into the chamber or, as explained above, the hydrogen halide can be generated in situ in the reaction medium.

Generally, the same methods can be used for separating out the metal halide products and removing the iron from the two-component reaction system as from the single-component vapor reaction system.

The metal halide products of the acid-selective reduction reaction must be separated from the gangue and the iron compounds removed. Practically, at least some of the metal halides are admixed, including the iron halide. Even in the vapor distillation high temperature process, it is not practical to completely fractionate to the pure halides. The metal halides often remain in admixture with the gangue from the nodule, except, of course, in the fractionation process. It is important to remove iron because it is generally present in rather large quantities, is of relatively low value compared to the other metals which are present, and tends to interfere with many of the preferred methods for further purifying the metals.

Accordingly, the preferred method of separating the metals following a vapor phase acid-selective reduction process is to leach the nodules to form an aqueous solution of the salts of the desired metals, i.e. copper, nickel, cobalt and manganese, separating out the insoluble gangue and removing all iron compounds. The solution formed can contain up to about 225 g/liter of manganese as metal but preferably contains manganese in a concentration of from about 50 to about 225 g/liter of metal, and optimally in a concentration of from about 150 to about 200. The concentrations of the other metals are proportional to their concentrations in the nodules.

To separate the iron from the remaining metals can be relatively simply done by converting iron halide to iron oxide. When the halides are present in the dry state, this can be done by contacting the nodule with water at temperatures greater than about 200°C:

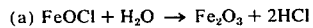
(a) $FeOCl + H_2O \rightarrow Fe_2O_3 + 2HCl$

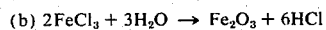
(b) $2FeCl_3 + 3H_2O \rightarrow Fe_2O_3 + 6HCl$

Ferric oxide is a water-insoluble material and therefore when the dry reacted nodule material is contacted with liquid water the chlorides are leached out and dissolved in the water leaving behind the ferric oxide.

Alternatively the iron halide can be dissolved together with the remaining halides; in the case of the reaction utilizing aqueous hydrogen halide the iron chloride remains in the solution with the other metal chlorides. The ferric chloride can be converted to ferric oxide by mixing caustic with the aqueous liquor to a pH of at least about 2.5, or the iron can be separated by interalia selective extraction. Extractants which are selective for iron halides include, for example, organic phosphate esters and organic amines.

The insoluble material can be separated from the aqueous leach solution containing the soluble metal halides by any of several methods including filtering, decanting, thickening or centrifugation, or any other procedure for separating liquids from solids. The leaching can be carried out by the batch or continuously; especially by counter-current flow. The solution of metal halides is then ready for separation into the individual metal compounds preparatory to forming the elemental metals.

Preferably, pure water is not used as the leach liquid. An acid leach liquid is preferably used, one having a pH of not greater than about 4, and preferably not greater than about 3. It has been found that the optimum maximum pH for the leach liquid is about 2. The lower pH tends to increase substantially the proportion of copper halide which is dissolved. It is believed that at higher pH's, copper halide tends to hydrolyze, forming an insoluble product, which will remain behind with the iron oxide and gangue.

Preferably the leach liquid is maintained at substantially ambient temperatures. There is substantially little or no advantage in utilizing higher temperatures. The term "leach liquid" in this specification is applied to the aqueous solution utilized for dissolving water-soluble metal halides in order to separate then from insoluble gangue and iron oxides following a vapor-phase acid-selective reduction reaction.

Because of the rather complex mixture of materials which are obtained from such ocean floor nodules, many of the standard hydrometallurgical methods for separating out metal halides are not directly applicable because of the presence of various interfering ions. However, the following procedures can be utilized for obtaining at least the pure cobalt, copper, nickel and manganese halides.

In the preferred system for separating the halides, the copper halide is first removed from the aqueous solution. In describing the process, the chlorides are used as an example of the halides.

A group of materials known to the art as liquid ion exchange agents, can be utilized for the extraction of copper. Such materials include a group of substituted 8-hydroxyquinolines, α-hydroxy oximes and naphthenic acids. The oximes and quinolines generally are preferred because of their ability to separate more cleanly the various metal salts, and because the same compound can be used to extract each of the metals from solution.

The 8-hydroxyquinoline compounds, which are especially useful for the separation of the metal chlorides in accordance with the present process, can generally be defined by the following formula:

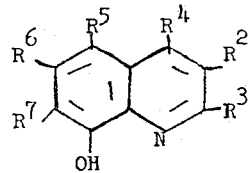

wherein each of the R groups can be hydrogen or a hydrocarbon group, or inertly substituted hydrocarbon groups, such as alkenyl, alkyl, alkynyl, cycloalkyl, cycloalkenyl, aryl or combinations thereof, such as alkaryl, aralkyl, aralkenyl, alkyl-cycloalkyl, etc.

At least one of the R groups however must be a hydrocarbon group. Any inert substituent can be present, as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2% by weight in the organic solvent.

The preferred position of the hydrocarbyl substituent on the 8-hydroxyquinoline nuclear structure is such as to form preferentially a complex with the desired metal ion in the aqueous solution. The sum of the carbon atoms in the R groups must be at least about 8 and can be as high as 24 or more. The preferred R groups are alkylbenzyl groups or beta-alkenyl groups containing from 12 to 18 carbon atoms, preferably attached at the $R^5$, $R^6$, or $R^7$ position. The optimum position for substitution is at the $R^7$ position to obtain the highest degree of efficiency. For a more complete description of these hydrocarbyl-substituted 8-hydroxyquinolines see Republic of South Africa Pat. No. 69/4397 to Budde Jr., et al. assigned to Ashland Oil, Inc.

Representative compounds useful in this invention and within the scope of the above general formula are: 7-octylbenzyl-8-hydroxyquinoline, 7-dodecylbenzyl-8-hydroxyquinoline, 7-nonylbenzyl-8-hydroxyquinoline, 7-ditertiarybutylbenzyl-8-hydroxyquinoline, 7-hexadecyl-8-hydroxyquinoline, 7-octadecyl-8-hydroxyquinoline, 7-hexadecenyl-8-hydroxyquinoline, 7-dibenzyl-8-hydroxyquinoline, 7-dimethyldicyclopentadienyl-8-hydroxyquinoline, 7-dicyclopentadienyl-8-hydroxyquinoline, 7-dodecylphenyl-8-hydroxyquinoline, 7-phenyldodecenyl-8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The 8-hydroxyquinolines are preferably utilized in solution in organic solvents, preferably hydrocarbon or chlorinated hydrocarbon solvents. Such preferred solvents include benzene, toluene, xylene, the various commercial mixtures of aromatic hydrocarbon solvents available on the market, aliphatic hydrocarbon solvents such as hexane-heptane mixtures, light fuel oil, kerosene and other hydrocarbons. Chlorinated such hydrocarbon solvents such as chlorobenzene, are useful in this regard. Generally liquid aliphatic, cycloaliphatic, aromatic, cycloaliphatic-aromatic or aliphatic-aromatic hydrocarbons or chlorinated such hydrocarbons can be preferably utilized. Optimally, the solvents have specific gravities in the range of from about 0.65 to 0.95 and mid-boiling points in the range of from about 120° to 615°F (ASTM distillation). However, substantially any liquid can be used as a solvent that meets the following criteria: (1) a solvent for the extracting agent; (2) a solvent for the metal-containing chelate; (3) immiscible with water, and (4) readily separable from water. The extracting compound and the metal-containing such compound are both preferably soluble in the solvent to the extent of at least 2% by weight.

The second preferred type of metal extractant are the alpha-hydroxy oximes, which are disclosed inter alia in U.S. Pat. Nos. 3,224,873, 3,276,863 and 3,479,378. These materials have the general formula:

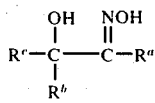

wherein the $R^a$, $R^b$ and $R^c$ groups can be any of a variety of organic, hydrocarbon radicals such as aliphatic and alkyl aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^c$ are also preferably the same, and when alkyl are preferably linked to the central carbon atoms by a secondary carbon atom. $R^b$ is preferably hydrogen or unsaturated hydrocarbon or branched chain alkyl group containing from about 6 to about 20 carbon atoms. The oxime preferably contains a total of from about 14 to about 40 carbon atoms. Useful, R, R' and R'' groups include in addition to hydrogen, the mono-and polyunsaturated groups such as heptenyl, octenyl, decenyl, octadecenyl, octadecynyl, ethyl octadecenyl. Alkyl groups include 2-ethylhexyl, 2,3-diethylheptyl,2-butyldecyl, 2-butylhexadecyl, 2,4-ethylbutyldodecyl, 4-butylcyclohexyl, and the like. Examples of the preferred alpha hydroxy oximes include 19-hydroxyhexatriaconta-9, 27-dien-18-oxime; 5,10-diethyl-8-hydroxytetradecan-7-oxime; 5,8-diethyl-7-hydroxydodecane-6-oxime.

These alpha-hydroxy oximes are also utilized in an organic, water-immiscible solvent, in which they should be soluble to an extent of at least about 2% by weight. The useful solvents are set forth above for use with the 8-hydroxyquinoline compounds. The alpha-hydroxy oximes or the 8-hyd oxyquinolines can be present in the solvent in amounts of from about 2 to 50% by weight, based on the total solution, but preferably in amounts of from about 2 to about 15% by weight.

Solutions of the extracting agents which are known as chelating agents, or "liquid ion exchange agents", generally are improved in their extracting efficiency by the presence of materials known as conditioners. Such conditioners include, long chain aliphatic alcohols, such as capryl alcohol, isodecanol, tridecyl alcohol and 2-ethylhexanol. The modifiers act, it is believed, by improving the phase-separating properties of the organic solvent from the aqueous leach liquid. The conditioners or modifiers, can be present in amounts of up to about 20% by volume of solution, and generally are aliphatic or cycloaliphatic of from 6 to 16 carbon atoms.

The above two types of liquid ion exchange materials are especially preferred for the separation of the metal chlorides found in the leach liquid obtained from ocean floor nodules because it has been discovered, as an aspect of this invention, that a single one of these reagents can be utilized for the selective removal of all of the important chlorides from the leach liquid. Thus, by utilizing either an α-hydroxy oxime or an 8-hydroxyquinoline, a single leach solution can be utilized for removing, in seriatim, all of the desired metal halides. It is unnecessary to utilize a multiple extractant system when utilizing these materials, but it is merely necessary to vary the pH of the leach solution following each successive extraction. Other extraction materials which can be used to separate one or more of the metals include the organic phosphates and amines, described above for use in removing the iron compounds, and naphthenic acid.

Beginning with an aqueous leach liquid containing dissolved copper halide, cobalt halide, nickel halide and manganese halide as the primary solutes, plus a variety of other metal halides in minor concentrations, the extraction of the individual metals can preferably be carried out by the following general procedure with oxime or hydroxyquinoline chelating agents, or liquid ion exchange agents, as the extracting solution:

(1) adjust the pH of the leach liquid to a desirable pH, (2) mix the leach liquid with an immiscible organic liquid containing an extractant specific to a metal at that pH; preferably, copper is extracted initially at a pH of not greater than about 2.5, preferably from about 1.5 to about 2.5, and optimally of from about 1.8 to 2.2; the best results are obtained at a pH of about 2; (3) separate the aqueous raffinate from step (2), adjust the pH as necessary, and mix the raffinate with an immiscible organic liquid containing an extractant specific to another metal at the pH of the aqueous phase. Generally, nickel and/or cobalt are extracted at a pH of from about 3 to about 6 and preferably about 3 to about 3.5 with chelating, or liquid ion exchange, agents, and cobalt is extracted at a pH of from about 3.5 to 7, preferably from 3.5 to about 6, optimally from 3.5 to about 5 and the most economical results at from 3.5 to about 4.5. At too high a pH, the manganese, nickel and cobalt tend to precipitate and this is preferably avoided. Further, increasing pH too much is expensive, in using up alkaline material.

Alternatively, cobalt is first extracted using a secondary, tertiary or quaternary amine extractant of the type defined above for use to remove iron from solution. The tertiary amines are preferred for extracting cobalt, and especially the trialkyl amines, containing from about 6 to about 12 carbon atoms in each group, such as triisooctyl amine, triisodecyl amine and tricapryl amine. The amine extractant is dissolved in an inert organic liquid in which both the amine and the ammine metal salt are soluble in concentrations of at least 2%. There can also be present a modifier such as one or more of the higher alcohols described above. The higher alcohols are preferably present in concentrations of from 5 to 30 volume percent. The organic solvents are selected on the same basis as those defined above for use with the oximes and hydroxyquinolines. Aromatic and aliphatic petroleum hydrocarbons are preferred. Nickel is then extracted from the aqueous raffinate using an α-hydroxy oxime or 8-hydroxyquinoline, as defined above at a pH of from about 3 to about 3.5.

To more efficiently extract cobalt from the leach liquid using an amine the concentration of halide ions in the leach liquid should be at least about 2N and preferably at least about 4N to form a cobalt tetrahalide complex in the leach liquid. The cobalt tetrachloride complex is preferred.

Preferably, the cobalt and nickel are extracted simultaneously and then selectively stripped from the extracting phase.

The ratio of cobalt and nickel removed from the leach liquid by the extractant is determined by the pH, i.e. the relative proportions of nickel and cobalt can be the same as that which is present in the leach liquid or it can have a greater proportion of nickel or a greater proportion of cobalt. Generally the higher the pH the greater the proportion of cobalt extracted. It is preferred, usually, to remove the nickel and cobalt in the same porportions as the metals are present in the leach liquid. Therefore, the pH for this ratio should be maintained during the extraction.

It is usually necessary to continually add alkaline material during the extraction stages in order to maintain the desired pH. The chelating agents act by releasing hydrogen ions when extracting metals, and thus the pH would tend to decrease during extraction. Caustic soda solution is preferably used. The sodium ion generally does not interfere with the further processing of any metal salt. However, other useful basic materials include generally alkali metal oxides and hydroxides, alkaline earth metal hydroxides and oxides, and their corresponding carbonates, such as calcium hydroxide, potassium hydroxide, lithium hydroxide, lithium carbonate, magnesium carbonate, calcium carbonate, ammonium hydroxide and carbonate, manganese hydroxide and manganese carbonate. Buffering agents can also be added; however, this can add an undesirable impurity to the leach liquid.

Each extraction step can be carried out with one or more extraction stages until the desired amount of metal is extracted.

(4) The metal-containing organic extractant phases are stripped of the metal values by contacting with an aqueous stripping solution, generally an acidic solution is used. Generally, following stripping the extracting solution can be recycled to the process.

Copper can be readily stripped by any mineral acid, in an aqueous solution, having hydrogen ion concentration of from about 1N to about 10N and preferably from about 2N to about 6N. The concentration of hydrogen ion must be at least slightly in excess (preferably 5%) of the stoichiometric amount needed to substitute for the metal in the extract. The preferred acids include sulfuric acid, nitric acid, and hydrochloric acid. As the acid used determines the metal salt to be formed, this can be a basis for selecting the acid, if a particular salt is desired.

The cobalt can be stripped from the ammine extract using a weakly acidic, i.e. pH of from about 2 to about 3.5, water solution.

Where nickel and cobalt are extracted together, the nickel can first be stripped using a relatively weak acid aqueous solution, such as the mineral acids or the stronger organic acids, such as chloracetic acid, in a concentration of from about 0.01N to about 3N acid and preferably from 0.1N to about 1.0N. Cobalt can then be stripped from the chelate using a strong mineral acid aqueous solution in a concentration of at least 6N hydrogen ion and 6N chloride ion. Strong hydrochloric acid, containing at least 20% by weight HCl is preferred.

The aqueous raffinate leach liquid remaining after the cobalt and nickel are removed contains substantially all of the manganese halide which was leached from the nodule plus minor amounts of the halides of other metals. The leach liquid can be utilized per se to obtain relatively impure manganese, the degree of impurities being very slight. However, if a high quality manganese is needed, it is advisable to separate the manganese from the other metals. This can be done in various ways: "cementation", passing the solution through a bed of manganese metal particles, which results in the removal of the more noble metals by substitution therefore by manganese, or precipitation, as by sulfide precipitation of the other metals present.

The remaining manganese salt in solution can then be utilized for the preparation of manganese metal by any conventional means. The presence of alkali or alkaline earth metals results in no interference at this point.

All of the solutions which are obtained by the extracting methods can be further treated by conventional means to obtain the metal from the salts either from the solution directly or by first drying the solution and then treating the metal salt.

When using an amine to extract cobalt, a certain proportion of manganese can be extracted when present at higher concentrations in the leach liquid. Accordingly, it may be necessary to further treat the extract to separate the manganese from the cobalt to obtain a pure cobalt compound. Manganese can be selectively stripped from the extract or selectively extracted from a weak acid stripping solution, i.e., having a pH of from about 2.5 to about 3.5 which stripped both cobalt and manganese.

Manganese is selectively stripped from the ammine extract utilizing an aqueous chloride solution having a concentration of chloride ion of from about 1N to about 12N and preferably from about 6N to about 12N, and a pH of not greater than 7. Aqueous HCl, of from about 1N to about 12N is most preferred. Generally, the higher the concentration of manganese in the ammine extract, and the lower the organic-to-aqueous phase ratio in the stripping system, the greater should be the chloride concentration.

The cobalt can then be stripped using a weakly acidic aqueous solution. Further concentration of the cobalt solution can be obtained by further extraction using, e.g. a dialkyl phosphoric acid.

When the cobalt and manganese are stripped together from the ammine extract using a weak acid solution, the stripping solution can be extracted to remove manganese. Useful manganese extractants include phosphoric acid diesters having the general formula:

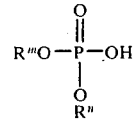

wherein the R groups are hydrocarbyl groups and preferably alkyl groups containing from 6 to about 12 carbon atoms each. Preferred R groups, include 2-ethylhexyl, isodecyl, 2-ethylbutyl and octyl. Examples of useful compounds include di(2-ethylhexyl) phosphoric acid, di(isodecyl)phosphoric acid, (2-ethylhexyl) (2-ethylbutyl)phosphoric acid and di(octyl)phosphoric acid. The phosphoric acid diesters are especially useful in solution, 5 to about 30% by volume, in aliphatic or aromatic hydrocarbons of the type described above for use with oximes and hydroxyquinolines preferably, with a modifier.

The above diesters selectively extract manganese when the aqueous phase is at a pH of from about 2.5 to about 3.5. The manganese can be stripped from the phosphoric acid diester extract using an acid stripping solution containing at least a stoichiometric amount of hydrogen ion to replace all of manganese in the extract, and preferably an excess of 1N hydrogen ion. When the concentration of the cobalt in the aqueous raffinate following extraction of the manganese is too low to be fed directly to an electrolytic cell, the concentration can be increased by evaporation or, preferably, by further extraction, using phosphoric acid diesters and further stripping with an aqueous solution, at a pH of from about 3.5 to 7.

As yet another alternative, cobalt can be extracted from the aqueous solution containing manganese and cobalt, at a pH of from about 3.5 to about 7, using one of the oximes or hydroxyquinoles described above.

Other methods of separating metal halides from leach liquids are within the scope of the present invention. Such methods include utilizing other types of extracting solutions than those described above, or it can include other types of separating procedures such as are generally well known in analytical chemistry for separating various ions, including resinous ion exchange materials. It is believed that the above described extracting processes are the most economical procedures to be followed based upon the concentrations and kinds of metals which are present in the nodules and which are transferred into the leach liquid once they have been halogenated and reduced in the first stage of this process.

The solutions of the individual metal salts can then be treated in a conventional manner to obtain the elemental metals. For example, manganese chloride can be reduced to manganese either in an aqueous electrolytic cell, in a fused salt electrolytic cell or by reduction with a less noble metal, e.g. aluminum. Nickel and cobalt salts can be reduced to metal from aqueous solutions in electrolytic cells as can be copper. These are conventional procedures well known to the art and form no part of this invention. Other nonelectrolytic processes include for example, cementation, by passing a solution of copper, for example, over iron or any other less noble metal. Similarly, the solution of copper salt can be dried, the salt oxidized to cupric oxide and then reduced, for example, with carbon. Nickel and cobalt can also be reduced other than by electrolysis: forming the oxides and reducing as above, or by passing hydrogen through the aqueous solution thereof.

Referring to the drawings accompanying this application,

Figure 1:
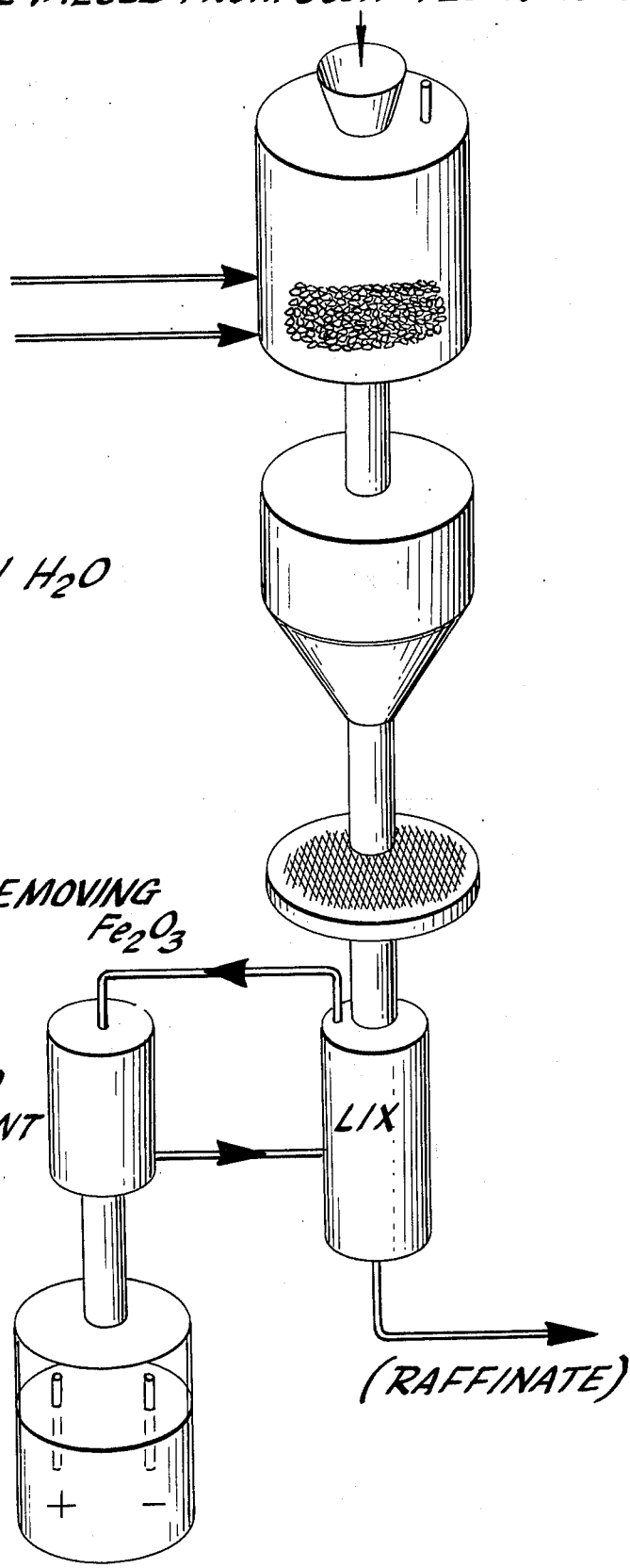
FIG. 1 is a schematic representation showing the general method of recovering metal values from ocean floor nodules by reaction with hydrogen chloride gas, as a general example of reacting with hydrogen halides.
Figure 2:
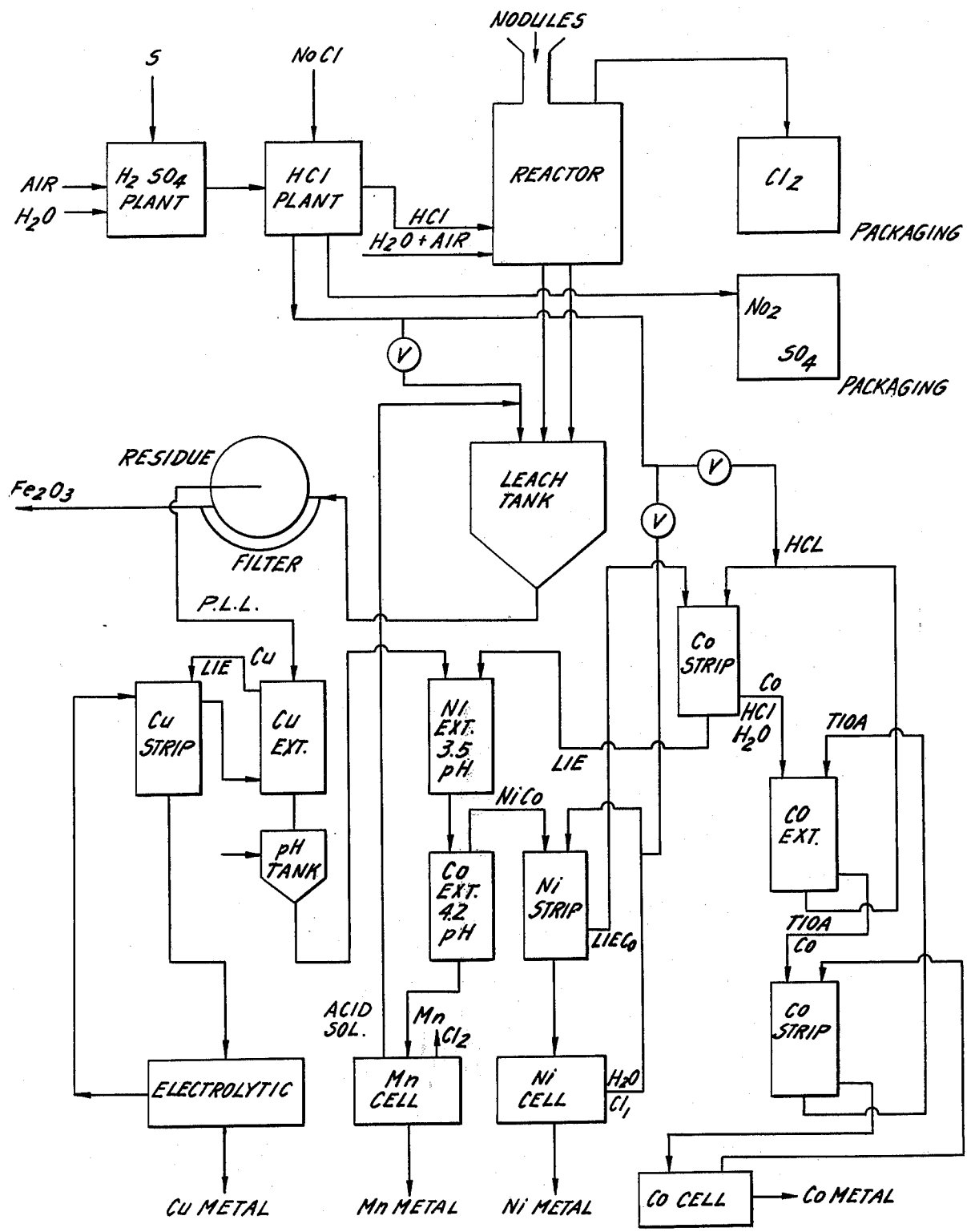
FIG. 2 shows a general flow diagram for a hydrochlorination process, utilizing hydrogen chloride gas. Again as a representative example of reacting with vapors of hydrogen halide, at medium temperatures of between 125° and 600°C.

Referring to FIG. 2, particulate nodule ore preferable with a particle size not greater than about 10 mesh on the U.S. sieve scale, and most preferably in the range from about 35 to about 100 mesh, is passed into a reaction vessel together with hydrogen chloride vapor. The reactor is maintained at a temperature of from about 450° to about 1100°C. The reaction vessel can be a batch type or a continuous flow type, wherein the HCl and the nodules are passed in preferably countercurrent flow. Subsequent to removal of the reacted nodules from contact with HCl, the nodule is contacted at a temperature of from 200° to about 400°C with water, preferably with a sparge to remove HCl, passing through the nodules at a rate of from about 1.0 to about 1.5 SCFM/lb. nodule.

The proportion of water in the carrying gas is not critical. Although pure water can be used. The carrying gas is preferably air. The reaction vessel can provide a stationary or a fluid bed of the nodules through which the hydrogen halide is passed; it can be a shaft furnace, a multi-hearth furnace or a rotating type furnace. The reaction with water vapor can be carried out in the same reaction vessel after clearing of the HCl vapor or, alternatively, in a moving bed type of reactor, the water vapor can be injected at a point downstream from where the nodules are contacting the hydrogen halide vapor.

As shown in FIG. 2 the chlorine byproduct is packaged; however, a portion can also be recycled and utilized as a carrying gas for the water.

Following the reaction with water to convert the iron chloride to iron oxide, the reacted nodule material is passed into a leach tank where it is contacted with an acidic aqueous leach liquid having a pH of from about 1 to about 2.5 preferably about 2. The leach liquid in this case is the aqueous solution from a manganese metal electrolytic cell, plus additional make-up HCl. The leach "tank" can be operated as a continuous flow operation, preferably countercurrent flow, of more than one leaching stage. The mixture from the final stage is preferably passed to a solid-liquid separator, such as a drum filter wherein any remaining solid residue, which includes the iron oxide and the gangue, is removed and the filtrate is then passed to further separation processes, in this case a liquid ion exchange system.

The leach liquid filtrate is extracted with a liquid ion exchange agent specific to copper at the pH of the filtrate, approximately 2.0. The liquid ion exchange reagent, an oxime or an 8-hydroxyquinoline, is dissolved in organic solvent medium which is immiscible with the aqueous leach liquid. The extraction solution and leach liquid are contacted in any conventional liquid-liquid extraction equipment. Preferably a multi-stage counter-current flow extraction is carried out, either multiple mixer-settler stage or in extraction columns. The aqueous raffinate from the final stage is substantially depleted of copper.

The organic extract phase is stripped of its copper by contact with a sulfuric acid solution, having a hydrogen ion concentration of about 2N to about 6N, in this case recycled from the copper electrolytic cell. The copper is stripped out as copper sulfate, which can be directly fed to the electrolytic cell. The organic extracting solution is then recycled.

To the aqueous raffinate is then added an alkaline material to increase the pH to the desired value. The raffinate is then extracted again with a liquid ion exchange agent, such as an α-hydroxy oxime or an 8-hydroxyquinoline in 5–25 percent by volume solution.

The pH of the aqueous phase is monitored and maintained at the necessary pH (3–3.5 for oximes or hydroxyquinolines) until most of the nickel is extracted, and the pH is then increased to at least 3.5, and preferably kept in the range of 3.5 to 4.5 until the remaining cobalt is extracted. The organic extract phase from the extraction system contains the cobalt and nickel, and the final raffinate aqueous phase is substantially depleted of these metals, and contains primarly manganese plus small quantities of other metals.

Alternatively, all of the nickel and cobalt can be removed by maintaining the pH of the aqueous phase during this extraction such that the ratio of nickel-to-cobalt which is extracted is substantially that in the leach liquid. This can be predetermined and the pH of the aqueous phase maintained to correspond to this proportion by continuously adding basic material during the extraction. Generally, the higher the pH the greater the proportion of cobalt which is extracted relative to the nickel, and vice versa.

The organic extract, which contains cobalt and nickel, is then stripped first of its nickel content using the aqueous chloride salt solution from a nickel electrolysis cell. To this solution is added sufficient make up HCl to increase hydrogen ion concentration to a sufficient degree to at least stoichiometrically replace the nickel from the extract; generally from about 2 to about 6N hydrogen in concentration is preferred. This is sufficient to strip out nickel without removing cobalt. The aqueous phase containing nickel is then fed to the nickel electrolytic cell.

The remaining organic phase layer is then further treated with a very strong aqueous solution of HCl containing at least 18% by weight of HCl: at least 6 N hydrogen ion concentration and 6 N chloride ion concentration. It is necessary that there be a sufficiently high chloride ion concentration to form the tetrachlorocobalt complex, which it is believed is needed in order to strip out cobalt. Although hydrochloric acid is preferred, as this provides both the necessary hydrogen concentration and chloride concentration, other strong mineral acids can be utilized in combination with soluble halide salts. The strongly acidic aqueous solution containing the cobalt as the only metal can then be extracted with a 5–30% solution of an organic tertiary amine, e.g. tri-2-ethylhexyl amine, readily stripped therefrom using the electrolyte solution from a cobalt cell, and the aqueous stripping phase fed directly to the electrolysis cell.

The nickel and cobalt chloride solutions are electrolyzed in aqueous electroplating cells of conventional type. The electrolysis solutions are continuously recycled as a stripping liquid to pick up make-up metal salt from the cells.

Figure 3:
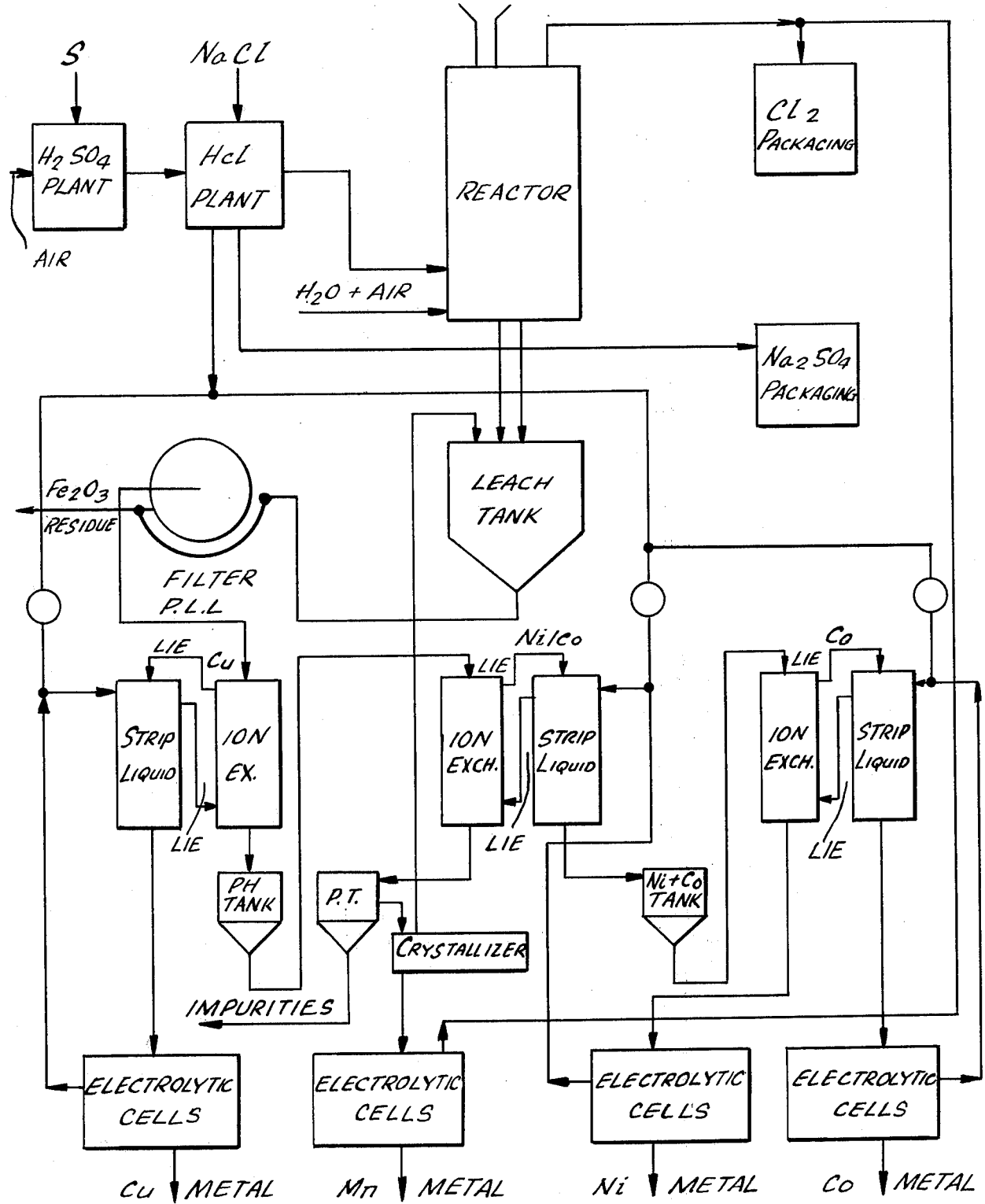
FIG. 3 is a flow diagram of a substantially identical procedure as in FIG. 2 but utilizing the fused salt electrolysis method for obtaining manganese metal, and a different Nickel-Cobalt separation scheme.

FIG. 3 shows substantially the same process as is described for FIG. 2 with two significant differences: First, the raffinate from the nickel-cobalt extraction is treated with hydrogen sulfide to precipitate impurities and the manganese chloride is crystalized. The crystals are then electrolyzed in a fused salt cell to produce elemental manganese and chlorine as a byproduct.

Second, the nickel and cobalt stripping solution is directly separated into cobalt and nickel and extracting with an 8-hydroxyquinoline or oxime to extract cobalt at a pH of at least about 9.2 wherein $NH_3$ is used to increase the pH to the desired level, and then the cobalt is stripped from the extract.

Figure 4:
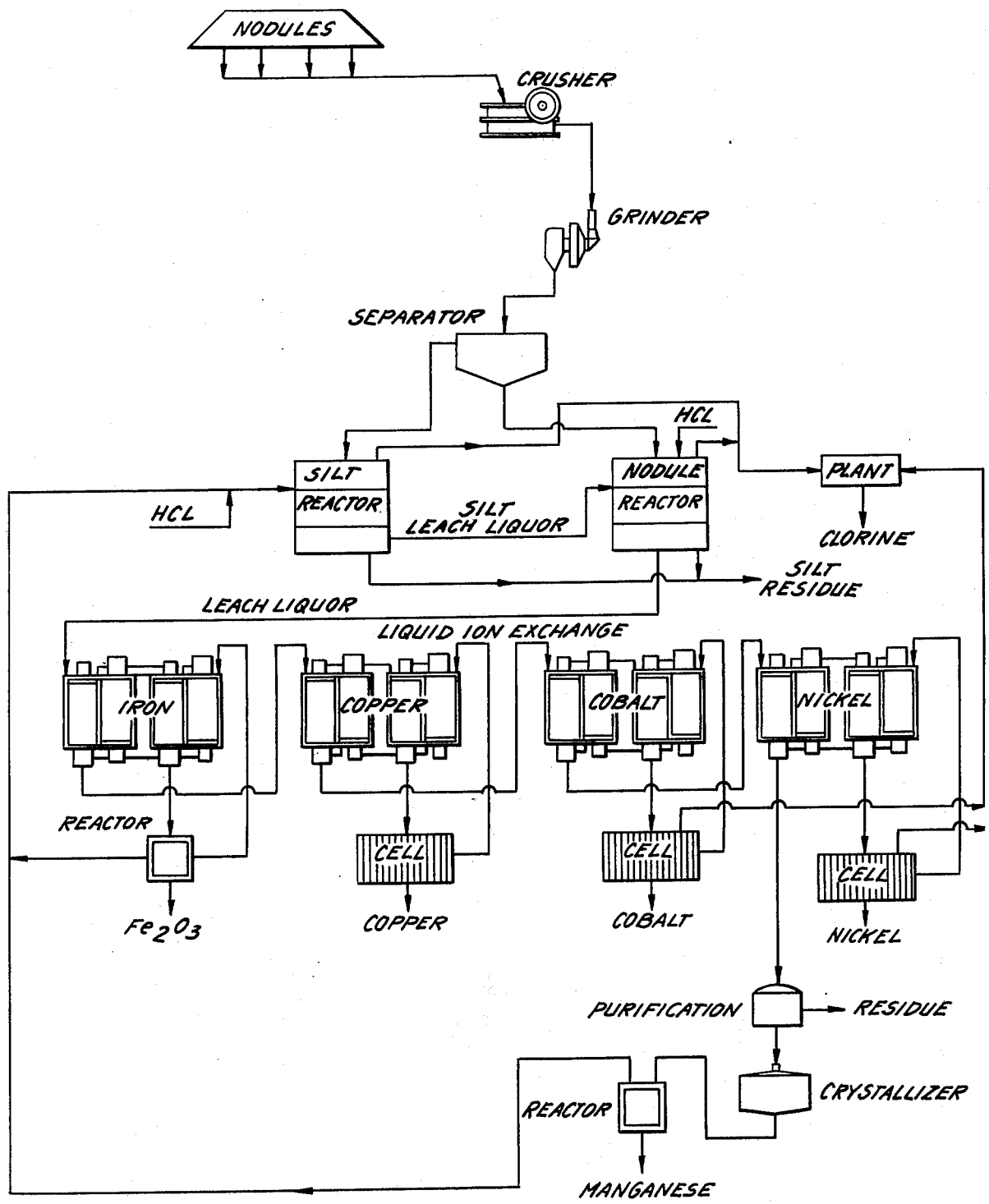
FIG. 4 is a schematic flow diagram for the aqueous solution hydrohalogenation process.

Referring to FIG. 4, various process steps for utilizing an aqueous solution of a hydrogen halide as the acid-selective reducing agent are shown.

The nodules as obtained from the ocean floor often are combined with material, of a silt-like nature, consisting primarly of quartz and silicates. The amount of this silt-like material is substantially decreased by crushing, milling and attritional scrubbing. The resulting particulate nodule material can be separated from the silt by conventional means such as a hydroclassifier. The overflow fraction generally contains the silt combined with fines. The silt is therefore separately reacted with HCl to remove these metal values. The underflow from the hydro classifier is then pretreated with an aqueous solution of $FeCl_3$ to remove certain undesirable alkaline substances that may be present and passed to the acid-selective reducing reaction stage.

The reactor, as shown, is a multi-stage reactor system, wherein the nodules are passed counter-currently to the hydrogen halide solution, and the chlorine byproduct is vented from each stage.

The reaction with the aqueous hydrogen halide solution proceeds with substantially any concentration of the hydrogen halide. However, to avoid having to handle excessive amounts of water, solutions of less than 1% by weight hydrogen halide should not be used. Preferably, a concentration of hydrogen halide of at least 10% by weight hydrogen halide is used. Optimally a saturated solution is used, e.g. 36% by weight HCl, and additional hydrogen halide vapor bubbled in during reaction. As shown in FIG. 4, the anhydrous hydrogen halide, exemplified by HCl, is bubbled into alternate stages through the aqueous solution.

The aqueous leach solution having the final reactor stage has a pH of not greater than about 2 to avoid precipitation of copper salt, and usually of from about 1 to about 2.

The final aqueous reaction liquid, containing the dissolved halides of manganese, iron, cobalt, nickel and copper, is then passed to a liquid ion exchange system to remove the iron by counter-current extraction with, e.g. an organic solution of a trialkyl phosphate or an amine. The ferric chloride is extracted from the leach liquid, stripped from the organic extract phase with water, the organic extraction solution is recycled for further use and the aqueous $FeCl_3$ solution is passed to the pretreatment stage for the nodules described above. The iron-free aqueous raffinate is then passed to a liquid ion exchange separation system, to separate the copper from the iron raffinate. Nickel, cobalt and manganese halides are separated by the above described procedures preparatory to reducing to the respective metals. As shown, the residual copper after the copper remaining after extraction stage is removed by cementation on iron metal. The iron is removed by converting iron chloride to iron oxide.

Figure 5:
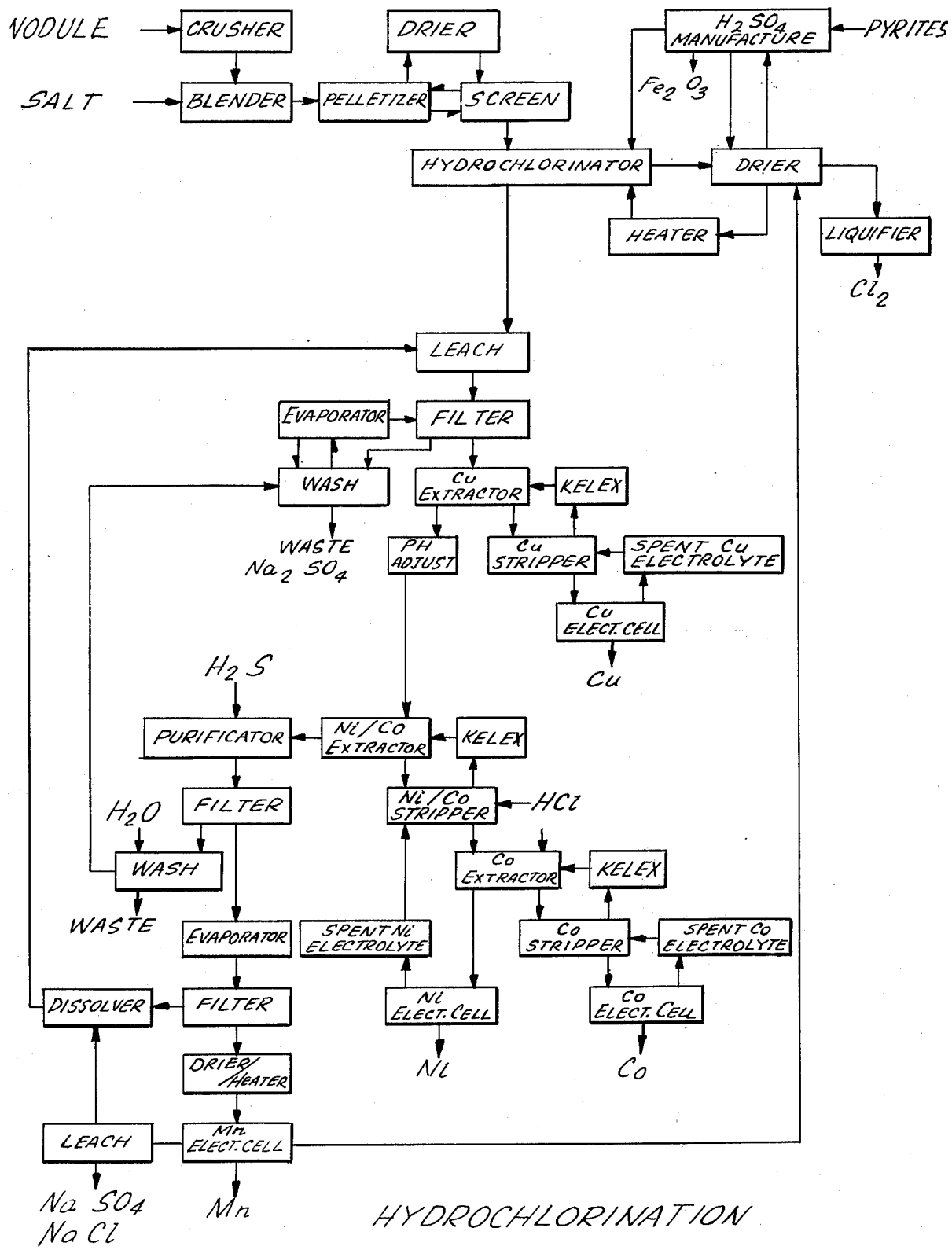
FIG. 5 is a schematic flow diagram of a vapor phase hydrochlorination process wherein the hydrogen chloride is prepared in situ by the reaction of a strong mineral acid and a metal chloride.
Figure 6:
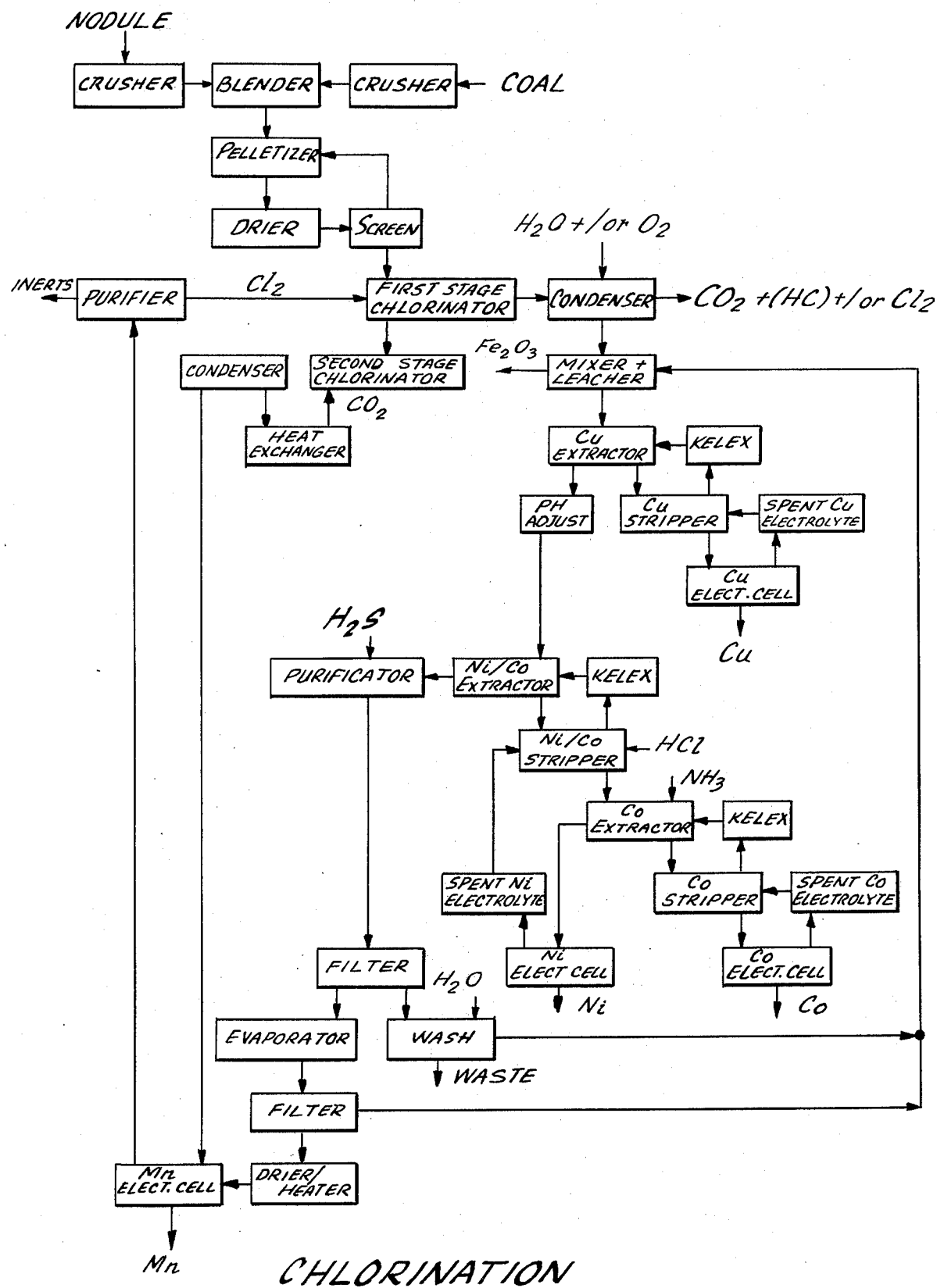
FIG. 6 is a schematic flow diagram of a process utilizing a two-component acid-selective reduction agent: a mixture of chlorine and a carbonaceous material, coal.

Referring to FIG. 5 the nodules after being crushed are blended with a halide salt, pelletized, dried and mixed in the hydrochlorinator with sulfuric acid, or other strong mineral acid. HCl is described above for HCl provided from an external source. The remainder of the process system is substantially the same as was described above for the other reaction processes. The hydrohalogenation product is reacted to change the iron chloride to iron oxide, leached to form a leach liquid including copper, nickel, cobalt and manganese, plus a variety of other metals, but excluding iron. These metal salts are then separated by any of the procedures set forth above.

Figure 7:
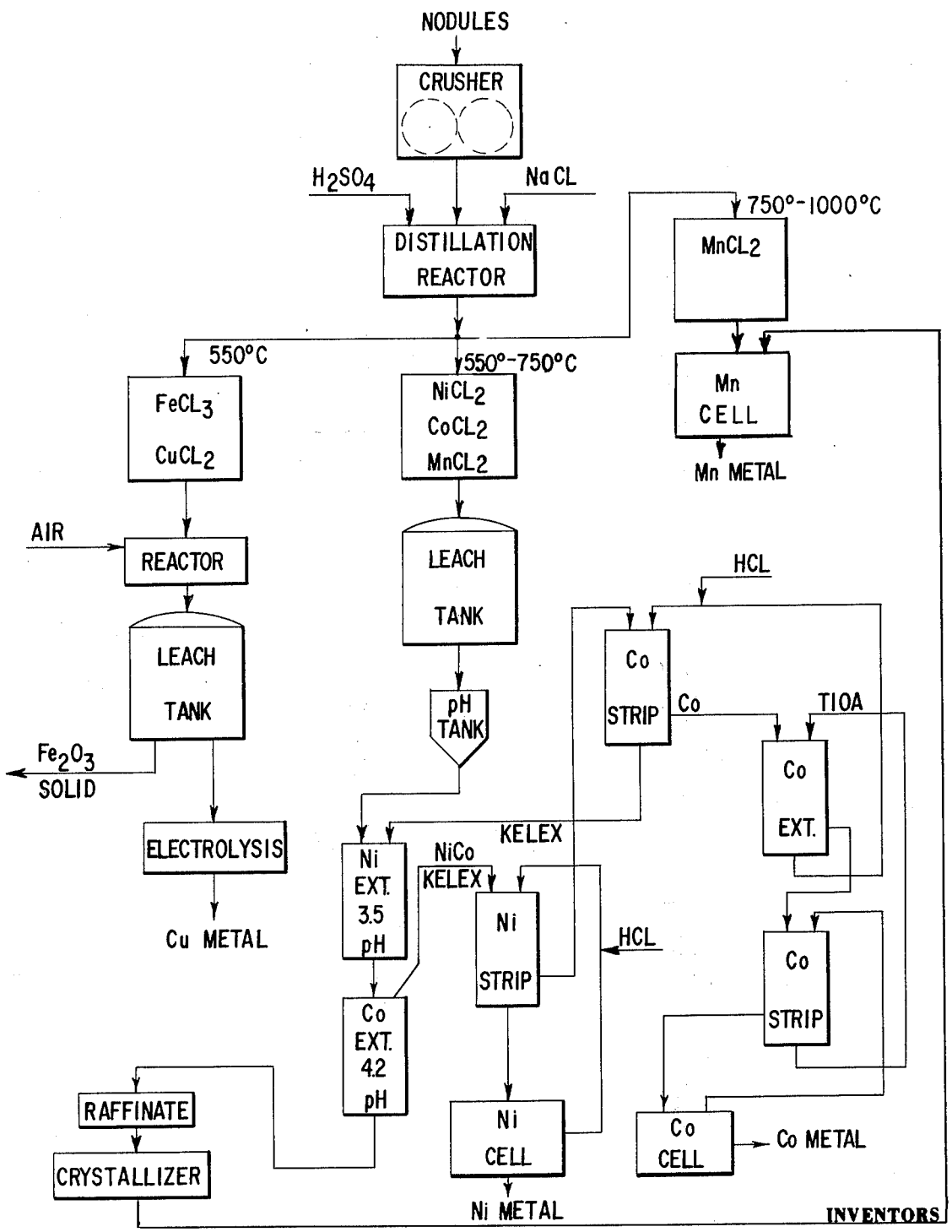
FIG. 7 is a schematic flow diagram showing hydrochlorination of nodules at high temperatures wherein the hydrogen chloride is formed in situ by reaction of a metal chloride and a mineral acid.

Referring to the process in FIG. 7, the nodules are crushed and blended with a carbonaceous material, such as coal or coke, pelletized, dried, screened and passed into a first stage chlorinator where they are contacted with chlorine gas at temperatures of greater than about 700°C. The temperatures in this first stage chlorinator are sufficiently high so as to evaporate off and permit the removal of substantially all of the copper, iron, nickel and cobalt chlorides plus a portion of the manganese chloride. The overhead vapors are passed to a condenser where they are contacted with humid air which serves to aid in the condensation of the metal halides and also serves to convert the iron chlorides to iron oxide. The condensed materials are then mixed with an aqueous solution to dissolve the remaining metal chlorides and the leach liquid is then separated by decantation from any solid iron oxide present. Further, as an alternative to water, oxygen can be passed into the condenser at temperatures greater than about 400°C to form iron oxide and chlorine. The leach liquid is then separated into its component metal halides by the procedures outlined above. The nodules from the first chlorinator stage are then passed to a second chlorinator stage at a higher temperature of at least about 800°C. Manganese chloride is evaporated and removed overhead. The manganese chloride is condensed substantially pure and can be electrolyzed as a solid in a fused salt cell.

Figure 8:
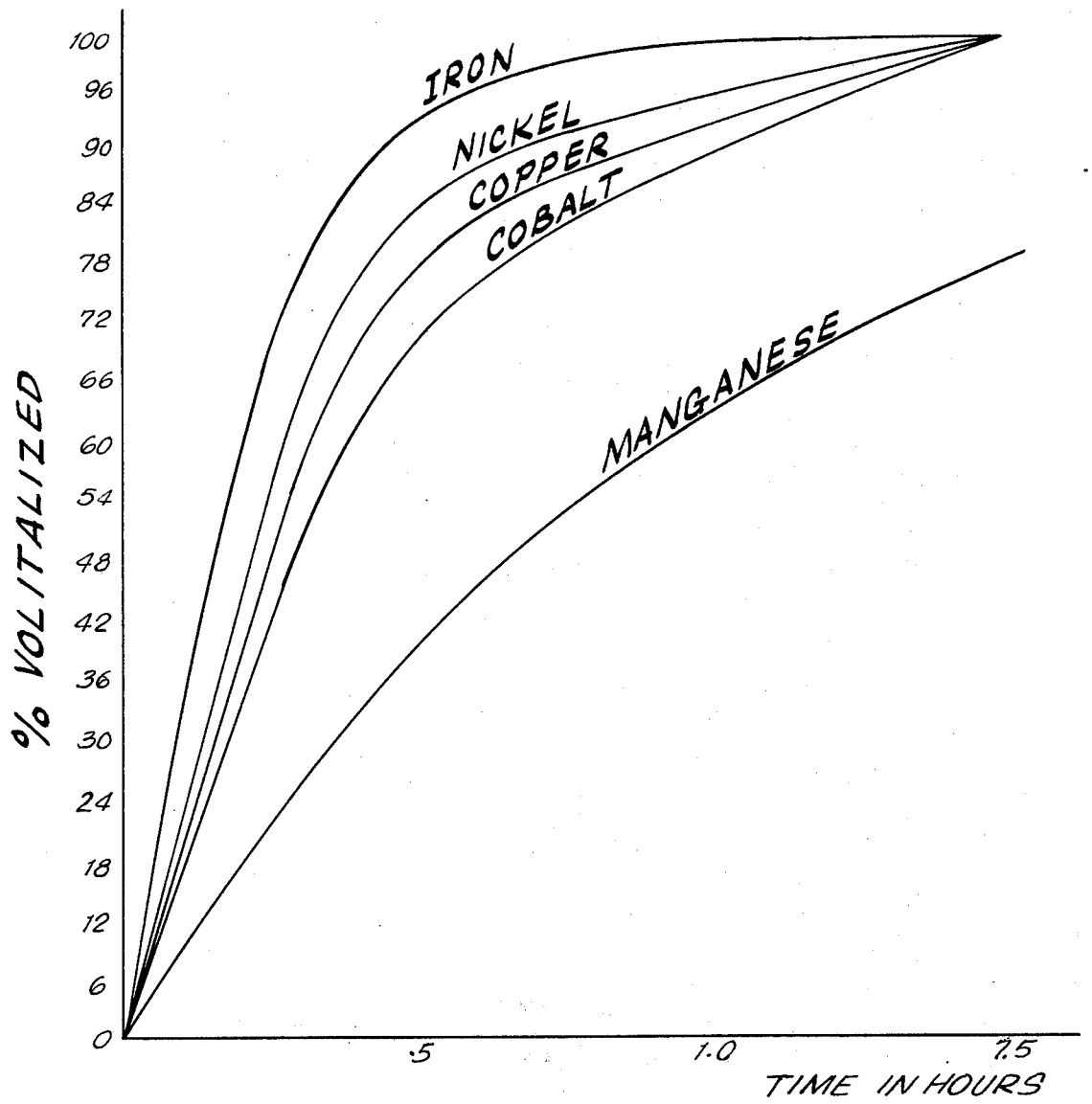
FIG. 8 is a graphical representation showing percentage of volatilization of metal chlorides following the reaction of a nodule with coal and chlorine and in situ generated HCl at 950°C.
Figure 9:
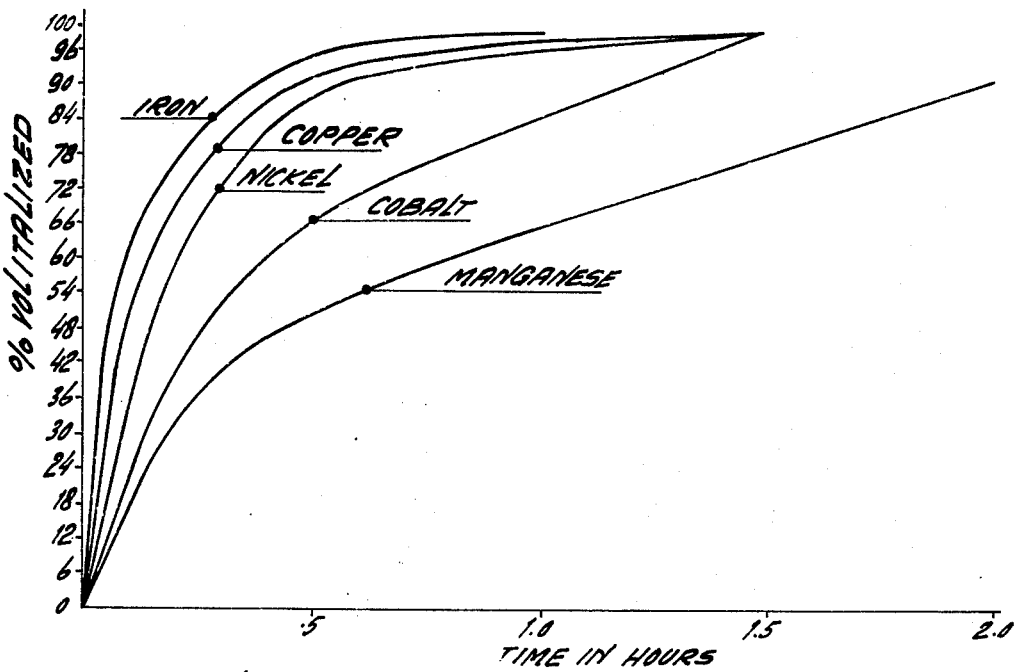
FIG. 9 is a graphical representation showing the percentage of volatilization of metal chlorides with time following treatment of nodules with coal, chlorine and mixture of NaCl plus $H_2SO_4$ at 950°C.
Figure 10:
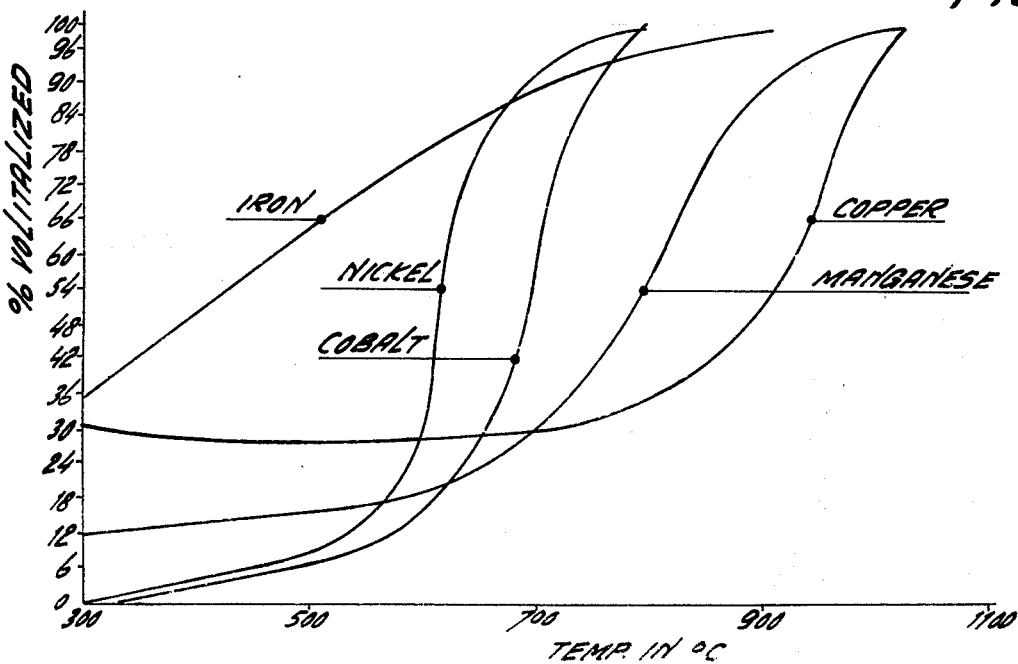
FIG. 10 is a graphical representation showing the percent of metal chlorides volatilized following 4 hours treatment with hydrogen chloride.
Figure 11:
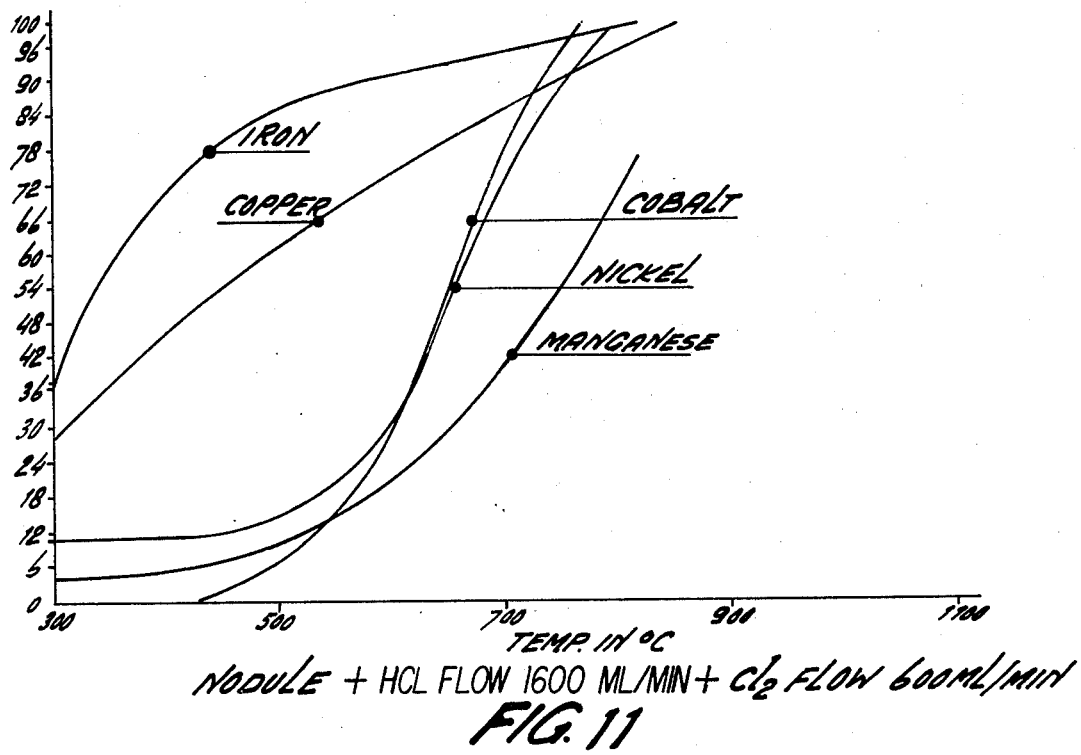
FIG. 11 is a graphical representation of the percentage metal halide volatilized after four hours of reaction with hydrogen chloride and chlorine.
Figure 12:
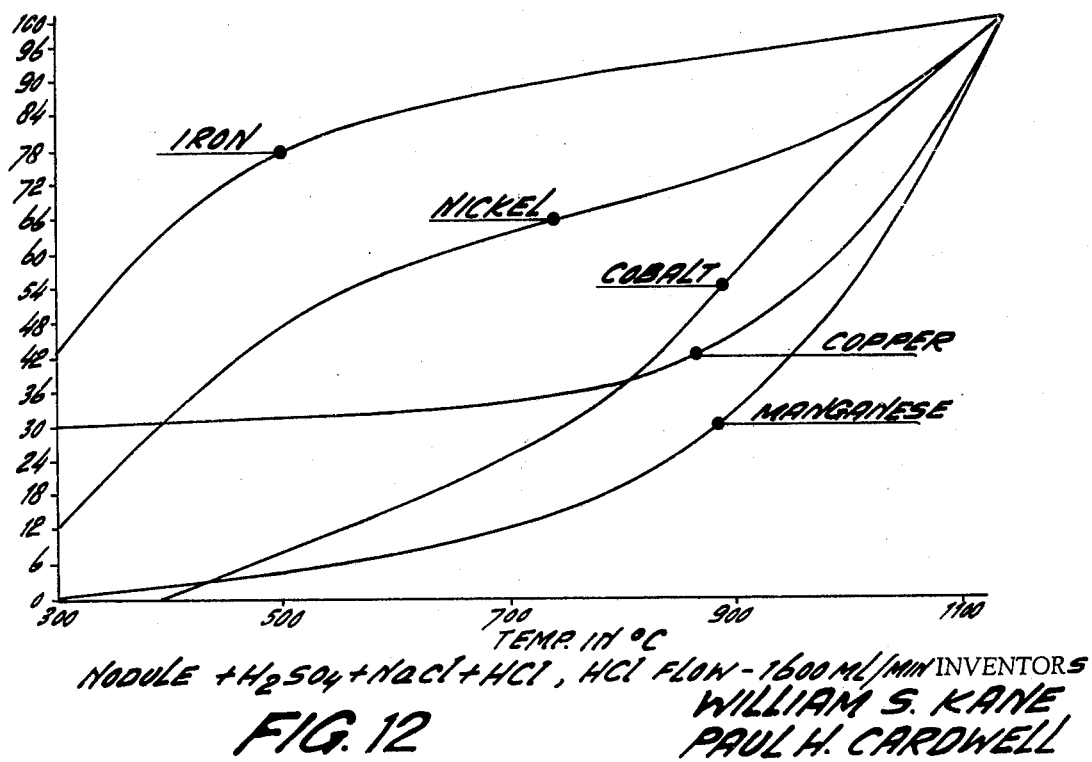
FIG. 12 is a graphical representation showing the percentage metal halides volatilized after four hours reaction with HCl plus a mixture of sulfuric acid and NaCl.

FIG. 8 depicts high temperature hydrohalogenation process utilizing HCl produced in situ by the reaction of sodium chloride and sulfuric acid. The high temperature reactor produces vapors of the halides which are then fractionally condensed as three fractions: the first, containing primarily the iron chloride and all the copper chloride; the second, containing primarily the nickel chloride and cobalt chloride plus some manganese chloride and the high temperature fraction, containing substantially pure manganese chloride. The low temperature fraction is reacted with air to convert the iron to the iron oxide. That fraction is then leached to dissolve the soluble copper chloride, which is sent to an aqueous electrolysis cell. The high temperature manganese chloride which is condensed in a substantially pure state is then sent directly to a fused salt reduction cell, either electrolytic or thermo-reduction. The middle fraction, containing a mixture of nickel, cobalt and manganese, is separated by a nickel-cobalt extraction system described above. The manganese being crystallized from the raffinate and forwarded to the reduction cell; the nickel and cobalt are electrolyzed in aqueous electrolytic cells.

One form of apparatus for use in fractionally subliming or condensing the respective halides include a set of rotating drums, as condensers, which are each maintained at a temperature below the sublimation temperature of the desired halide. The drums can be equipped with doctor blades which scrape the surface of the constantly rotating drums removing the deposits of the halides and carrying them away for further treatment as necessary.

The following examples set forth preferred embodiments of the present invention but are exemplary and not exclusive of the full range of this invention.

EXAMPLE 1

Ocean floor nodules were obtained having the following composition:

| Components | Percent by Weight |
|---|---|
| Manganese | 20 |
| Iron | 6.5 |
| Nickel | .88 |
| Copper | 0.55 |
| Cobalt | 0.12 |
| Other Metals | Minor |

The nodules were ground to an average particle size of less than 100 mesh and a 25 gram sample of the finely ground nodules was placed in a crucible and heated to 500°C. After the crucible reached the desired temperature, hydrogen chloride was passed through the nodules at a rate of 4SCFH during a two hour period. The HCl was discontinued and the crucible was then flushed with air at a rate of 8 SCFH for 15 minutes. The air had been saturated with water vapor at ambient conditions (about 25°C) by bubbling the air through water before passing it into the crucible. The crucible was maintained at 300°C during the air flow. The reactor nodules where then removed leached with 100 ml of aqueous HCl having a pH of 3.5. The nodules were mixed with leach liquid for a period of 60 minutes, and the liquid solid mixture permitted to settle. The liquid and solid particles were then analyzed following this single stage leaching operation. The above example was repeated but this time utilizing water, a substantially neutral leach liquid (having a pH of 7.2). A final test was carried out repeating the above examples but omitting the treatment with humidified air and leaching with aqueous HCl having a pH of 1.9. The proportions of manganese, iron, nickel, copper and cobalt which were dissolved from the nodules by the leach liquid in each case were determined and are set out in Table 1.

Table 1

| Example | Water Vapor After Hydrogen Chloride | Leach pH | Manganese | Percentage Dissolved | | | |
|---|---|---|---|---|---|---|---|
| | | | | Iron | Nickel | Copper | Cobalt |
| 1A | None | 1.9 | 94 | 27 | 100 | 96 | 100 |
| 1B | 15 minutes water saturated air | 3.5 | 79 | 0 | 84 | 70 | 90 |
| 1C | 15 minutes water saturated air | 7.2 | 82 | 0 | 86 | 42 | 99 |

As shown by the Table 1, the treatment with the saturated air was sufficient to effectively prevent the dissolution of iron in the leach liquid. The results further show that a pH of about 2 is preferred to obtain the greatest percent dissolution of all of the metals, the greatest effect being shown in the proportion of copper dissolved. At a higher pH copper chloride hydrolyzes to an insoluble state.

EXAMPLE 2

The procedure of Example 1B was repeated but utilizing an aqueous HCl leach liquid having a pH of 1.9. The pregnant leach liquid had the following composition:

| Component | Grams per liter as metal |
|---|---|
| manganese chloride | 60 |
| copper chloride | .405 |
| nickel chloride | 2.94 |
| cobalt chloride | 0.565 |

The leach liquid was passed countercurrently to an organic extracting liquid through 5 mixer-settler stages, at an organic-to-aqueous ratio of 6 to 31.5 by volume. The organic extraction liquid was a solution of 10% by volume of an alpha-hydroxyoxime (5, 8-diethyl-7-hydroxy dodecane-6-oxime, known as LIX-64N), plus 20% by volume isodecanol, in Napoleum solvent. Napoleum is a proprietary mixture of petroleum hydrocarbons having a boiling point range of 410°–460°F and a specific gravity of 0.81.

The copper content of the aqueous raffinate following the five stages of separation was only 0.001 grams per liter. There was substantially no manganese, nickel or cobalt found in the organic extract phase. The leach liquid at the start of the extraction stages had a pH of about 2 as set out in example 1 and additional caustic was added to maintain that pH during extraction.

Following the separation from the final settling stage, the organic extract is stripped of copper by spent acid solution from a copper aqueous electrolysis cell, utilizing countercurrent flow through 5 stages of a mixer-settler series. The aqueous stripping solution had a hydrogen ion concentration of 3N.

The aqueous raffinate from the copper extraction step was adjusted to a pH of about 4.2 by the addition of 2N caustic solution. The resulting aqueous solution was extracted in a five-stage mixer-settler system, with a solution of 10% by volume 7-[3-(5,5,7,7,-tertramethyl-1-octenyl)]-8-hydroxyquinoline plus 20% by volume isodecanol phase modifier in Napoleum. When the leach liquid i.e. copper raffinate has a pH of 4.2, the ratio of nickel-to-cobalt extracted was the same as the ratio in the leach liquid: 2.94 grams nickel per liter to 0.565 grams cobalt per liter.

The nickel is stripped from the organic extract phase using the spent solution from a nickel electrolysis cell to which hydrochloric acid is added to a concentration of hydrogen ion of 3N in order to insure stripping of all of the nickel. The organic and aqueous liquids are passed countercurrently through 5 mixer-settler stages at an organic-to-aqueous liquid ratio of 2:1, by volume. Substantially all of the nickel is removed from the organic phase. The organic phase is next stripped of cobalt next utilizing a 20% by weight aqueous HCl solution through another five mixer-settler stages. Cobalt is extracted from the 20% HCl solution utilizing a 10% solution of TIOA in Napoleum, at an organic: aqueous volume ratio of 2:1.

The cobalt is next stripped from the TIOA phase utilizing spent aqueous electrolyte from a cobalt electrolysis cell.

The raffinate from the nickel and cobalt extraction contains primarily manganese salts. Hydrogen sulfide is passed through the raffinate to precipitate various impurities leaving a substantially pure solution of manganese chloride.

There is thus obtained as a result of this process four separate final streams each containing substantially pure metal chloride: copper chloride, nickel chloride, cobalt chloride and manganese chloride. Each of these aqueous solutions can be further treated by known methods to prepare the respective elemental metal. Manganese is preferentially reduced in a fused salt electrolytic cell or in an aluminum reduction cell. The copper, nickel and cobalt are preferably electrolyzed in aqueous electrolytic cells.

EXAMPLE 3

Further portions of the copper raffinate from Example 2 were extracted at various pH's in a single stage mixer-settler operation with the 10% hydroxyquinoline solution used in Example 2, at a volume ratio of organic to aqueous of 1:2. The metal contents of the aqueous and organic phases were determined following the extraction and the extraction factor for each metal (E metal) were determined. The results are set forth in Table 3.

Table 3

$$E_{metal} = \frac{\text{Weight of metal in Organic Phase}}{\text{Weight of metal in Aqueous Phase}}$$

| pH | $E_{Mn}$ | $E_{Ni}$ | $E_{Cu}$ | $E_{Co}/E_{Ni}$ |
|---|---|---|---|---|
| 7.1 | 0.0075 | 3.7 | 11.1 | 3.0 |
| 6.3 | 0.0037 | 7.25 | 13.0 | 1.8 |
| 5.6 | 0.0015 | 6.52 | 8.2 | 1.25 |
| 4.0 | 0.00014 | 1.84 | 0.16 | 0.08 |

EXAMPLE 4

Ocean floor nodules, 8 lbs., were ground to pass a 35 mesh, U.S. Sieve standard, screen. The nodule material had the following composition of metals:

| Components | Percent by Weight |
| --- | --- |
| Manganese | 27.7 |
| Nickel | 1.3 |
| Copper | 1.06 |
| Cobalt | 0.02 |
| Iron | 6.03 |
| Other metals | Minor Amounts |

The ground nodules were placed in a single hearth furnace, which was heated to 500°C, and exposed to 90 SCFH hydrogen chloride, for a period of 2 hours. The hydrogen chloride flow was then halted and the furnace was then flushed with air which had been bubbled through water at ambient temperatures. The furnace was permitted to cool to about 300°C and the air blow was continued for a period of about 30 minutes. The reacted nodule material was then permitted to cool and was leached, in a countercurrent system utilizing 5 mixer-settler stages, with an aqueous leach solution having a pH of 2 and a weight ratio of nodule to leach liquid of 1:1.3. The percentage by weight of the metal in the nodule which was dissolved by the leach liquid water is as follows:

| Components | Percent by Weight |
| --- | --- |
| Manganese | 94 |
| Iron | 0 |
| Nickel | 97.4 |
| Copper | 96.1 |
| Cobalt | 97.6 |

The leach liquid contained manganese chloride (200 g Mn/l), nickel chloride (9.54 g Ni/l), copper chloride (7.68 g Cu/l), cobalt chloride (1.83 Co/l) and the halides of various other metals in minor proportions. The leach liquid was then separated from the solid undissolved material and extracted countercurrently through 4 mixer-settler stages with a 10% solution of 7-[3-(5,5,7,7-tetra methyl-1-octenyl)]-8-hydroxyquinoline in kerosene, which also contained 20% isodecanol. The aqueous-to-organic ratio in the extraction was 1:2.

The organic extract phase was then stripped of the copper, utilizing a sulfuric acid solution generated in a copper aqueous electrolysis operation. There was substantially no other metal found in the organic phase. The stripping solution containing the copper can then be utilized directly as the feed to an aqueous electrolysis cell for the production of copper metal. The organic solution can be recycled for further use in the extraction operation.

The copper raffinate is mixed with ammonium hydroxide solution to a pH of approximately 4.2, once again passed countercurrently through six mixer-settler stages with the extraction solution used for copper at an organic-to-aqueous volume ratio of 2:1, to extract nickel and cobalt. The pH is continuously monitored during the extraction of the nickel and cobalt so as that as the pH decreases during the initial stages of extraction to a pH of about 3.0, it is then increased to 4.2 by the further addition of ammonium hydroxide. The cobalt is extracted at a pH of 4.2, which tends to result in a decrease in pH to about 3.5, at which point nickel is extracted. This results in a further lowering of the pH to 3.0, at which point the addition of the alkaline material increases to pH to 4.2 and the cycle is repeated.

The organic phase from the nickel-cobalt extraction system is selectively stripped of nickel, first, using the solution generated in a nickel electrolysis cell, to which there has been added 10% by weight of hydrogen chloride. The stripping is accomplished again in a 3 stage countercurrent mixer-settler operation, removing substantially all of the nickel from the organic extracting solution.

The cobalt remaining in the organic extract phase is then stripped with an aqueous solution containing about 20% by weight HCl, again in a 4 stage countercurrent mixer-settler operation, at a temperature of about 40°C (between 30° to 50°C). Both stripping operations utilize an organic-to-aqueous volume ratio of 3:1. The metal-depleted organic solution is then recycled to the extraction operation.

The cobalt which is present in an extremely concentrated hydrochloric acid solution should not be directly utilized as feed to an electrolysis cell. The cobalt is extracted from the hydrochloric acid solution utilizing a 10% solution of triisooctyl amine (TIOA) in kerosene, containing in addition 12% isodecanol. The cobalt is extracted from the strong hydrochloric acid solution which can then be recycled for further use in stripping cobalt from the organic hydroxyquinoline phase. The cobalt is readily stripped from the TIOA solution using the aqueous solution from a cobalt electrolysis cell in a 3 stage countercurrent mixer-settler system.

The aqueous raffinate from the nickel-cobalt extraction is treated with hydrogen sulfide to precipitate metals other than manganese, which remains in the solution, and the manganese chloride is obtained by evaporation and crystallization. The dried manganese chloride crystal can be reduced, for example, in a fused salt cell or an aluminum reduction cell.

In the manganese electrolytic cell, manganese and chlorine are formed, in the aluminum reduction cell, manganese and aluminum chloride are formed. The manganese chloride must be mixed with another metal chloride, such as magnesium chloride or aluminum chloride, in order to facilite the electrolysis of the manganese in a fused salt cell.

The nickel and cobalt solutions are directly electrolyzed to form the respective metal, plating on the cathode, plus chlorine, at the anode.

EXAMPLE 5

Nodules, 20g, were ground to pass through a 35 mesh sieve. The nodules have the following composition by weight of metal:

| Components | Percent by Weight of metal |
| --- | --- |
| Manganese | 28.5 |
| Nickel | 1.35 |
| Copper | 1.1 |
| Cobalt | 0.26 |
| Iron | 7.1 |

Samples of 5g each of the ground nodules were each mixed with 6.95g sodium chloride and 5.95g sulfuric acid. Each mixture was heated to one of the temperatures set forth below in Table 4, for a period of one hour. The product was removed and leached with water as described in Example 1 above. The percentages of manganese, iron, copper, cobalt and nickel in the nodules which were hydrochlorinated and leached were then measured. Results are set forth in Table 4.

Table 4

| TEMPERA-TURE | PERCENTAGE HYDROCHLORINATED AND LEACHED | | | | |
|---|---|---|---|---|---|
| | MANGANESE | IRON | COPPER | COBALT | NICKEL |
| 300° | 67.0 | 73.2 | 84.0 | 83.4 | 78.2 |
| 375° | 79.1 | 81.4 | 91.8 | 85.5 | 83.0 |
| 450° | 83.2 | 56.6 | 86.1 | 85.5 | 78.1 |
| 525° | 92.5 | 0.1 | 94.7 | 88.0 | 71.5 |

As shown above the rather sudden drop of percent of iron in the hydrochlorination at 525°C was caused by loss of iron chloride due to evaporation.

The above procedure was repeated but the hydrochlorinated nodules are reacted with humid air before being leach with water of pH of 2. The same process, as is set forth in Example 2, is utilized for separating the metal chlorides. The sodium sulfate which is formed as a result of a reaction between the sulfuric acid and the sodium chloride remains with the manganese chloride and can be fed directly to the fused salt manganese electrolytic cell without interfering with this operation. It is merely necessary that excess sodium sulfate be removed as it accumulates.

EXAMPLE 6

The copper raffinate from example 1, i.e. which contains nickel, cobalt, manganese and smaller amounts of other metal ions, was injected with sodium hydroxide to increase the pH to 4.2 and then passed countercurrently through a 4-stage mixer-settler system with a solution of 7-[3-(5,5,7,7-tetramethyl-1-octenyl)]-8-hydroxyquinoline in kerosene plus 20% isodecanol. The pH is continually monitored and additional caustic is added when the pH is reduced to about 3.0 during the course of extraction to increase the pH to about 4.2. The aqueous raffinate phase was separated and the organic extract phase contained the nickel and the cobalt. The nickel and cobalt was then stripped from the organic phase utilizing a strong acid solution containing about 20% hydrochloric acid. The acid stripping solution was then mixed with additional caustic to bring it to a pH as shown in Table 5 below. The aqueous phase is contacted in a single stage operation with a solution of 10% of the above 8-hydroxy quinoline and 30% isodecanol in Napoleum, and the extraction factor was determined and is shown in Table 5 below.

EXAMPLE 7

Dry crushed nodule ore (2.5g) ground to pass through a thirty mesh sieve was placed in ceramic boat and positioned in a glass tube formed of a high softening point, low expansion glass. (Vycor) The tube is placed in a high temperature tube furnace. The tube has an inlet at one end and an outlet at the other end. The outlet is connected to a glass condenser through a valve located upstream from the condenser. The glass condenser is air-cooled. The reaction tube in the furnace is heated to 550°C and the air-cooled glass condensor is maintained at a temperature of about 300°C. Anhydrous hydrogen chloride was fed through the inlet at a rate of 1500 ml/min. and chlorine gas added at a rate of 600 ml/min. for a period of one hour. The metal chloride vapors existing through the outlet end of the tube passed to the glass condenser. The valve to the glass condenser was then closed and the gas flow discontinued. The first glass condenser was removed and replaced by a clean condenser. The hydrogen chloride and chlorine gas flow was resumed at the same rate and the furnace temperature raised to 800°C. After an additional hour the gas flow was halted, the valve closed and the condensor replaced again with a third clean condenser. The procedure was again repeated, maintaining the furnace at a temperature of 1000°C, and the third condensor again removed after 1 hour operation.

The material condensed in each of the three condensers was leached separately from each glass condenser and analyzed. The proportions of the total amount of metal in the nodule condensed on each condenser are set forth in the following table.

| Compo-nents (metals) | Percent by Weight of the Metal in the Nodule | | |
|---|---|---|---|
| | 550°C Furnace | 800°C Furnace | 1000°C Furnace |
| Iron | 88 | 11 | 1 |
| Copper | 67 | 31 | 2 |
| Nickel | 10 | 90 | trace |
| Cobalt | 6 | 94 | trace |
| Manganese | 7 | 50 | 43 |

Table 5

$$E_{metal} = \frac{\text{Weight of metal in Organic Phase}}{\text{Weight of metal in Aqueous Phase}}$$

| pH | Nickel Chloride Content As Nickel | Cobalt Chloride Content As Cobalt | Ammonium Chloride Content | Aqueous Phase/ Organic Phase Ratio | $E_{Ni}$ | $E_{Co}$ | $E_{Co}/E_{Ni}$ |
|---|---|---|---|---|---|---|---|
| 8.0 | 49.6g/L | 9.6g/L | 75.2g/L | 50/91 | 0.074 | 1.45 | 19.6 |
| 9.1 | 36.7g/L | 7.0g/L | 51.3g/L | 100/138 | 0.053 | 1.9 | 35.9 |
| 9.4 | 25.5g/L | 4.9g/L | 38.6g/L | 100/91 | 0.032 | 3.38 | 105.5 |

EXAMPLE 8

Crushed, dry nodule (2.5g), ground to pass through 30 mesh sieve, was mixed with 0.25g coal, containing 75 percent carbon, (110% stoichrometric amount of carbon required to reduce $MnO_2$) plus 0.74 NaCl, and 0.62 $H_2SO_4$ (20% theoretical amount for HCl production), in a ceramic boat. The boat was placed in a glass (Vycor) tube having an inlet and an outlet end which was positioned in a high temperature tube furnace. An air-cooled condenser, maintained at about 300°C, was attached to one end of the tube and chlorine gas added at the other at a rate of 600 ml/min. The furnace temperature is raised to 950°C prior to the initiation of the chlorine gas flow and maintained at that temperature for 2 hours.

The condensed chlorides were leached from the condensor following completion of the reaction and analyzed. The percentage of the metals present in the nodule recovered as the chlorides from the condenser was as follows: iron 98%, nickel 99%, copper 99%, cobalt 99%, manganese 86%.

EXAMPLE 9

A charge of dry, crushed nodule (2.5g), ground to pass through a 30 mesh sieve, was placed in a ceramic boat positioned in the center of a Vycor tube reactor, which is located in a high temperature tubular furnace. One end of the Vycor tube is connected to a three zone condensor in series with the tube reactor. The first zone nearest the tube is maintained at a temperature of 800° to 950°C. The second condenser zone was maintained at a temperature of 550° to 800°C and the third condenser zone was maintained at a temperature of 950°C and hydrogen chloride was passed through the inlet to the tube at a rate of 1600 ml/min. together with chlorine gas at 600 ml/min. The hydrogen chloride and chlorine flow was maintained for 4 hours. The gas flow was then discontinued and the condenser tubes disconnected and each tube separately leached with an aqueous solution.

The solution obtained from condenser number 1, closest to the reactor tube, was found to contain approximately 30% of the manganese present in the nodule and substantially no other metal. The intermediate condenser was found to contain 80% of each of the cobalt and nickel present in the nodule plus 65% of the manganese, 30% of the copper and 8% of the iron. The third condenser zone was found to contain the remainder of the metal chlorides, i.e. 5% of the manganese, 20% of the nickel and cobalt 92% of the iron and 70% of the copper. Thus this procedure resulted in the formation of substantially pure manganese which does not require any further treatment and the solution obtained from the second and third condensers are further separated utilizing a liquid ion exchange procedure.

The embodiments of this invention which are claimed as follows:

1. The process for the refining of ocean floor nodule ore, the ore comprising as major components the oxides of manganese and iron and as secondary components, compounds of copper, cobalt and nickel, the weight proportion of manganese to nickel and cobalt being in the range of at least about 9, the process comprises (1) reacting the nodule ore with an aqueous solution of a hydrogen halide to form a pregnant leach solution, comprising concentrations of dissolved manganous halide, ferric halide, nickel halide, copper halide and cobalt halide proportional to their concentrations in the nodule ore; (2) separating the pregnant solution from any solid residue; and (3) extracting ferric halide from the solution of the metal halides by contacting the pregnant aqueous solution with an organic water-immiscible extracting medium, comprising an extracting agent selective for ferric halide and selected from the group consisting of amines and organic phosphate esters, so as to extract the ferric halide into the organic solution and to form an iron-free raffinate.

2. The process of claim 1, wherein the hydrogen halide is hydrogen chloride.

3. The process of claim 2, wherein the aqueous solution of the hydrogen halide is reacted with the nodule ore at a temperature of at least about 100°C.

4. The process of claim 2, wherein the aqueous solution of the hydrogen halide is reacted with the nodule ore at substantially about the boiling point of the aqueous solution.

5. The process of claim 2, wherein the extraction agent is an aliphatic amine.

6. The process of claim 2, wherein the extraction agent is a N-alkyl-N-trialkylmethylamine having from about 12 to about 30 carbon atoms.

7. The process of claim 2 comprising, in addition, contacting the iron-free raffinate with a water-immiscible organic extracting solution comprising an extraction agent selective for copper and selected from the group consisting of alpha-hydroxyoxymes and hydrocarbon-substituted-8-hydroquinolines, the aqueous solution having a pH not greater than 2.5.

8. The process of claim 7 comprising, in addition, contacting the copper-free raffinate with an organic, water-immiscible extracting solution comprising a trialkyl amine to selectively extract cobalt into the organic solution and to form a cobalt-free raffinate.

9. The process for the refining of ocean floor nodule ore, the ore comprising as major components, the oxides of manganese and iron and as secondary components, compounds of copper, cobalt and nickel, the weight proportion of manganese to nickel-plus-cobalt being in the range of at least about 9, the process comprises (1) reacting at a temperature of at least about 100°C, the nodule ore with an aqueous solution of hydrogen chloride to form a pregnant leach solution comprising, concentrations of dissolved manganous chloride, ferric chloride, nickel chloride, copper chloride and cobalt chloride proportional to their concentrations in the nodule ore, the pregnant aqueous solution having a pH not greater than about 2; (2) separating the pregnant solution from any solid residue; (3) extracting ferric halide from the solution of the metal chlorides by contacting the pregnant aqueous solution with an organic, water-immiscible extracting solution, comprising a secondary aliphatic-trialkylamine extraction agent selective for ferric halide so as to extract the ferric halide into the organic solution and to form an iron-free raffinate; (4) contacting the iron-free raffinate with a water-immiscible organic extracting solution comprising an extraction agent selective for copper and selected from the group consisting of alpha-hydroxyoximes and hydrocarbon-substituted-8-hydroxyquinolines, the aqueous solution having a pH not greater than 2.5, and (5) contacting the copper-free raffinate with an organic, water-immiscible extracting solution comprising a trialkyl amine to selectively extract cobalt into the organic solution and to form a cobalt-free raffinate, whereby individual solutions of copper and cobalt values are obtained from the ore.

\* \* \* \* \*

UNITED STATES PATENT AND TRADEMARK OFFICE
CERTIFICATE OF CORRECTION

PATENT NO. : 3,950,486
DATED : April 13, 1976
INVENTOR(S) : PAUL H. CARDWELL and WILLIAM S. KANE It is certified that error appears in the above-identified patent and that said Letters Patent are hereby corrected as shown below:

Column 30, line 28, (claim 7, line 5) correct
" alpha-hydroxyoxymes " to -- alpha-hydroxyoximes --.
line
Column 30, line 45, (claim 9,/10), delete the comma ( " , " ).

Column 30, line 53, (claim 9, line 18), following " solution " , at the end of the line, delete the comma ( " , " ).

Signed and Sealed this

Thirty-first Day of August 1976

[SEAL]

Attest:

RUTH C. MASON
*Attesting Officer*

C. MARSHALL DANN
*Commissioner of Patents and Trademarks*